June 13, 1933.                    E. H. CLARK                    1,913,831
                        TRANSLATING AND RECORDING DEVICE
                    Filed Jan. 16, 1928        15 Sheets-Sheet 1

Fig. 1.

INVENTOR
Edgar H Clark

June 13, 1933.  E. H. CLARK  1,913,831
TRANSLATING AND RECORDING DEVICE
Filed Jan. 16, 1928    15 Sheets-Sheet 2

INVENTOR
Edgar H. Clark

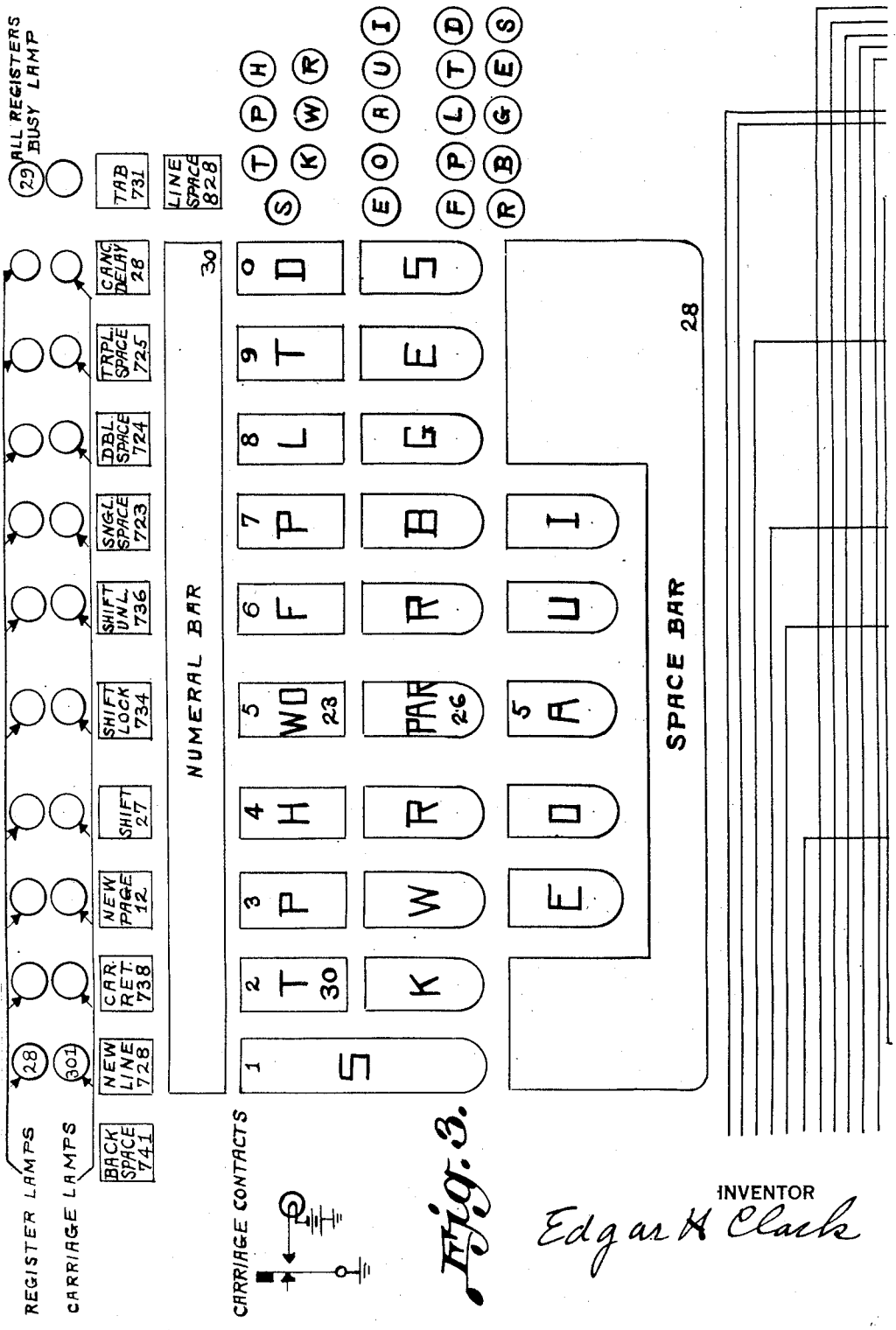

June 13, 1933.  E. H. CLARK  1,913,831
TRANSLATING AND RECORDING DEVICE
Filed Jan. 16, 1928   15 Sheets-Sheet 4

INVENTOR
Edgar H. Clark

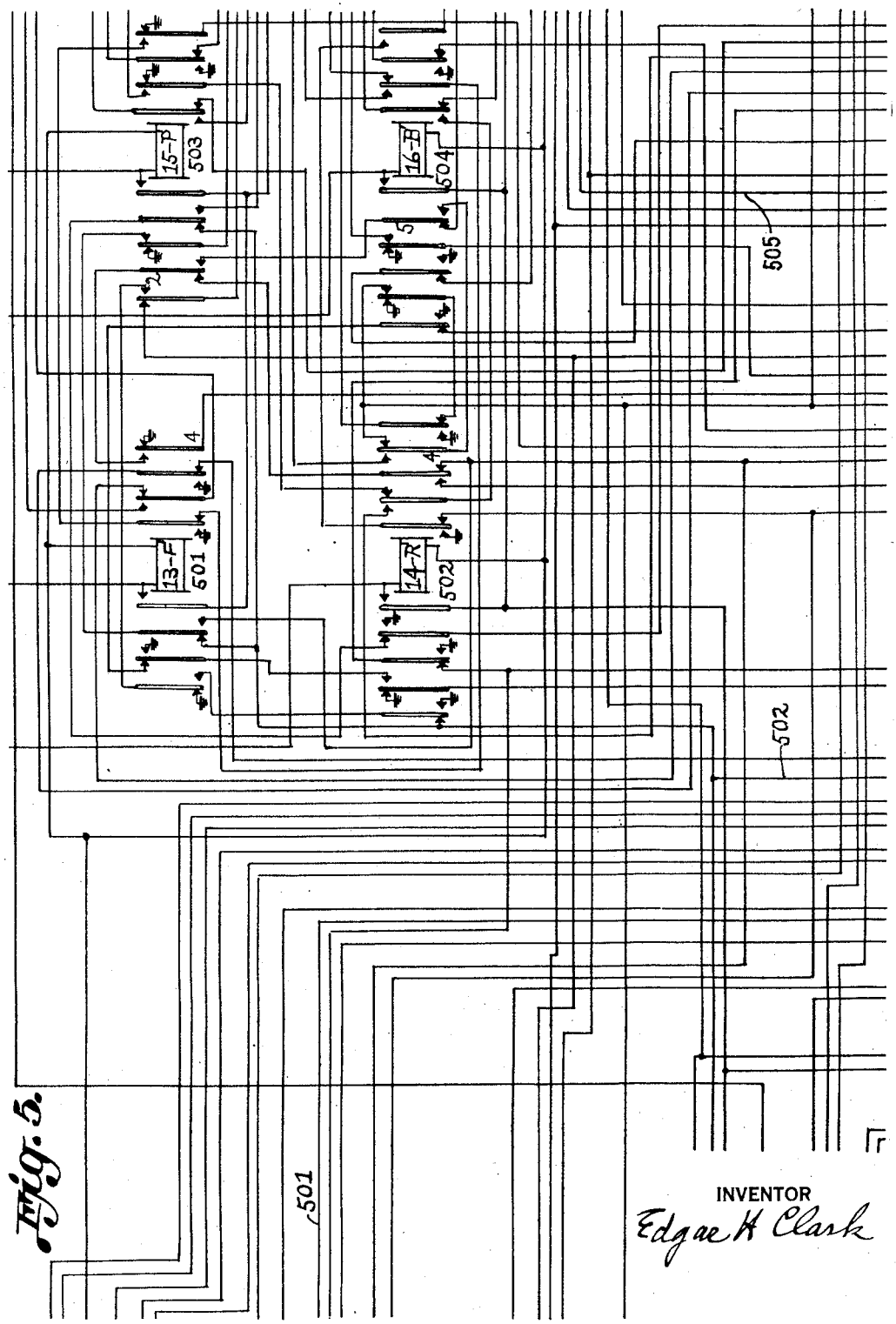

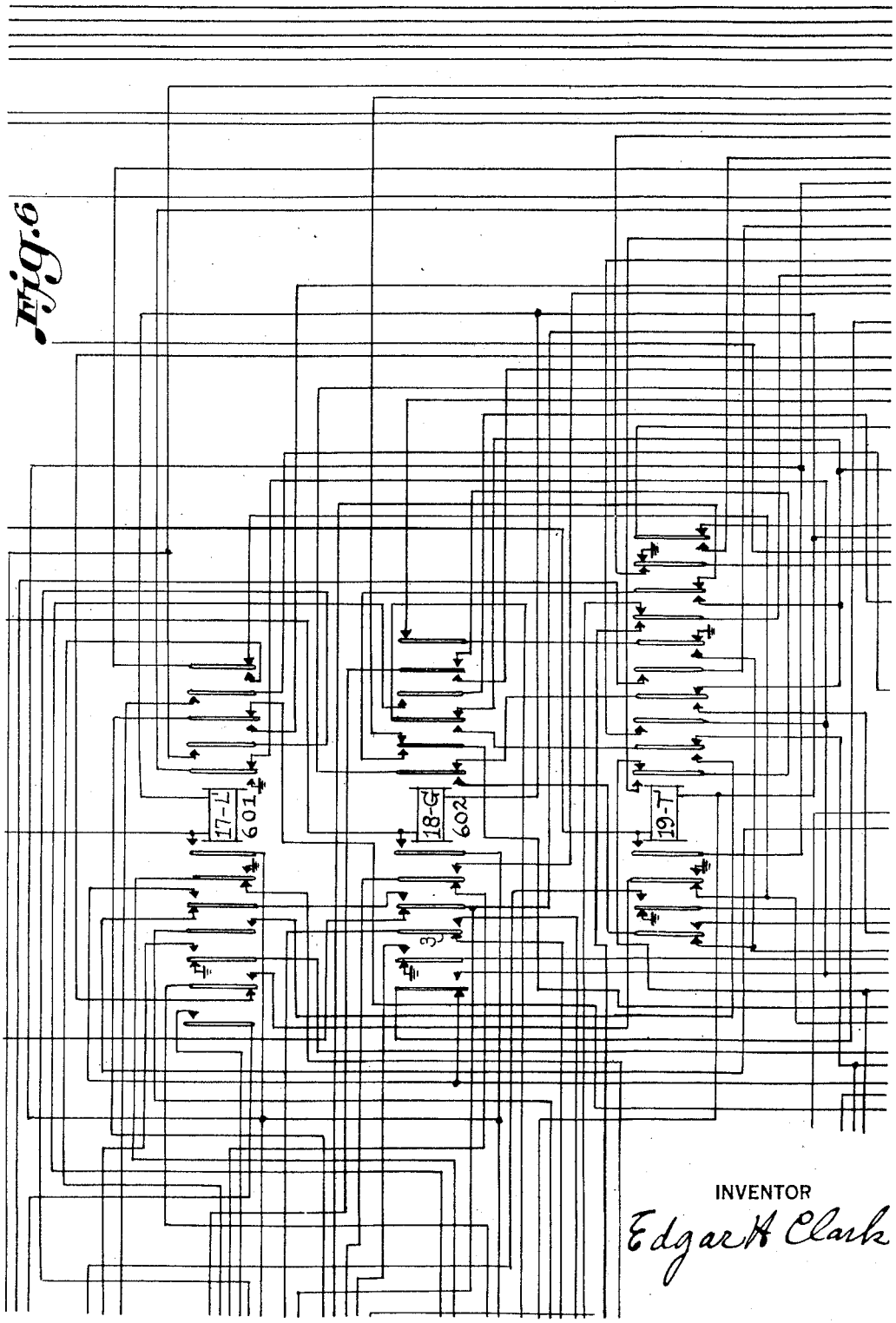

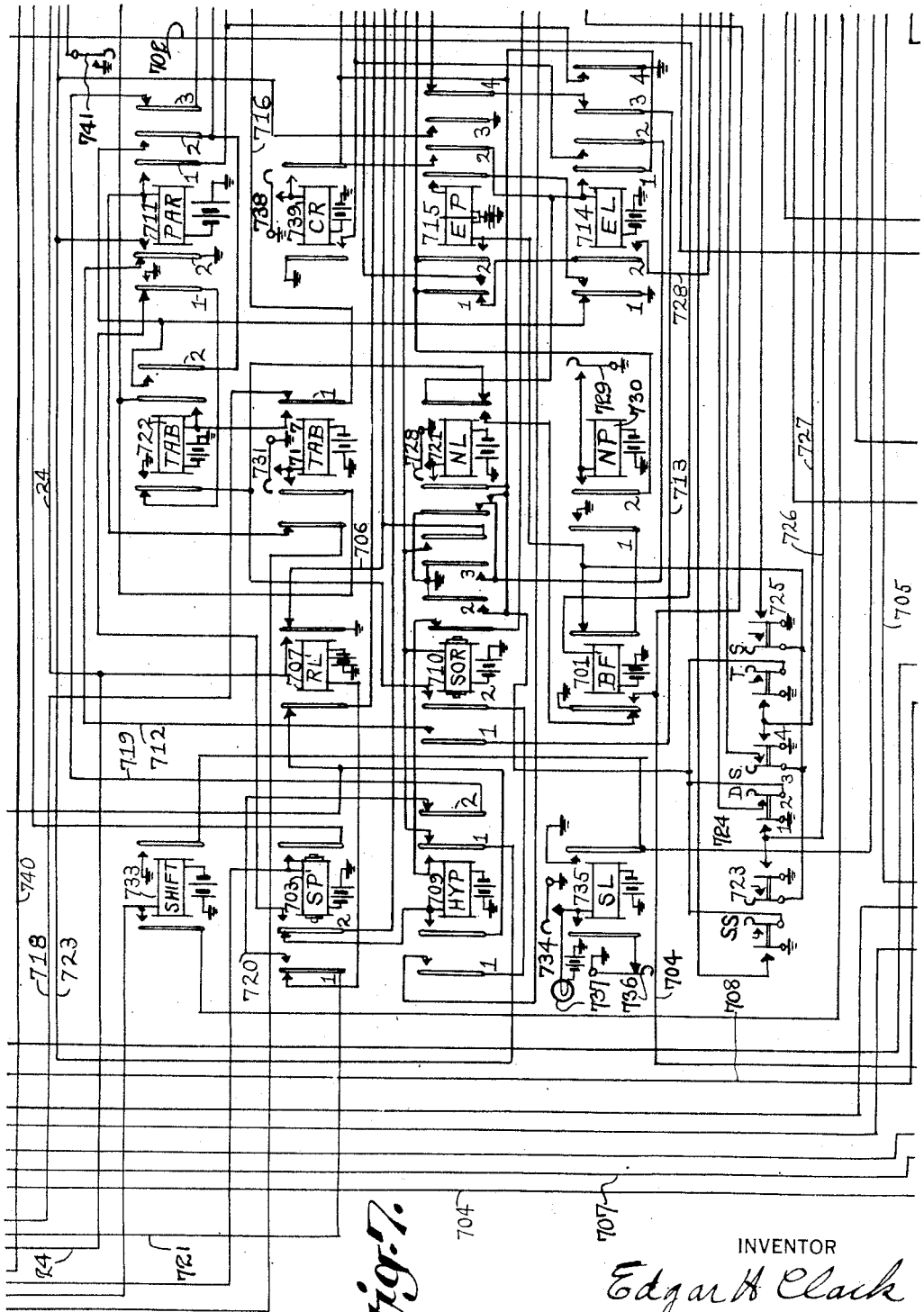

June 13, 1933.     E. H. CLARK     1,913,831
TRANSLATING AND RECORDING DEVICE
Filed Jan. 16, 1928     15 Sheets-Sheet 8

INVENTOR
Edgar H Clark

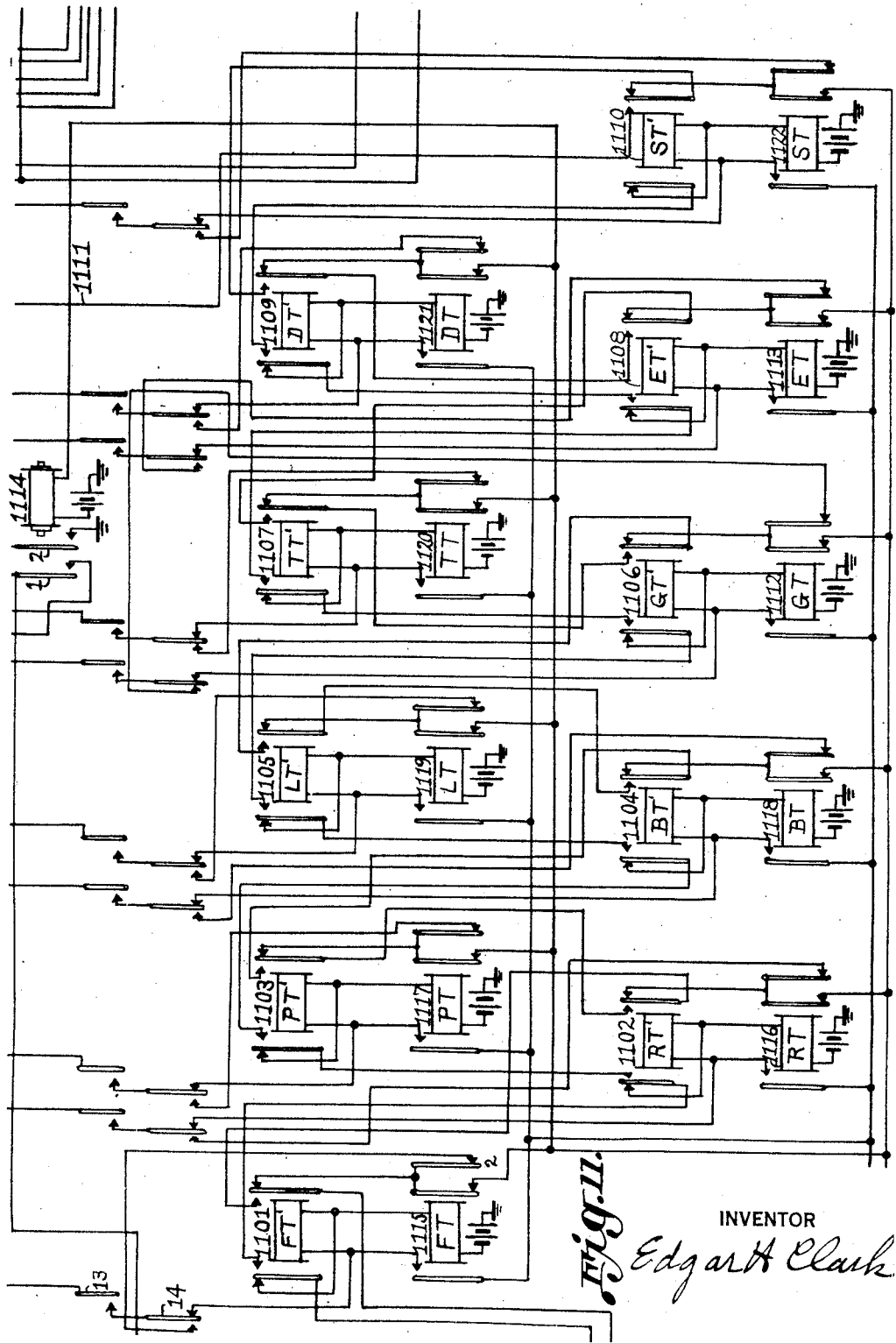

June 13, 1933.     E. H. CLARK     1,913,831
TRANSLATING AND RECORDING DEVICE
Filed Jan. 16, 1928     15 Sheets-Sheet 12

INVENTOR
Edgar H Clark

June 13, 1933.                E. H. CLARK                1,913,831
                      TRANSLATING AND RECORDING DEVICE
                      Filed Jan. 16, 1928       15 Sheets-Sheet 13

INVENTOR
Edgar H Clark

June 13, 1933.  E. H. CLARK  1,913,831

TRANSLATING AND RECORDING DEVICE

Filed Jan. 16, 1928    15 Sheets-Sheet 14

KEY COMBINATIONS    Fig. 14.

| INITIAL CONSONANTS | | | VOWELS | | | FINAL CONSONANTS | | |
|---|---|---|---|---|---|---|---|---|
| LETTER | KEYS | LEAD | LETTER | KEYS | LEAD | LETTER | KEYS | LEAD |
| S | S | 1 | E | E | 8 | F | F | 13 |
| T | T | 2 | O | O | 9 | R | R | 14 |
| K | K | 3 | A | A | 10 | P | P | 15 |
| P | P | 4 | U | U | 11 | B | B | 16 |
| W | W | 5 | I | I | 12 | L | L | 17 |
| H | H | 6 | EO | EO | 8-9 | G | G | 18 |
| R | R | 7 | EA | EA | 8-10 | T | T | 19 |
| D | TK | 3 | EU | EU | 8-11 | E | E | 20 |
| F | TP | 4 | EI | EI | 8-12 | D | D | 21 |
| B | PW | 4 | OA | OA | 9-10 | S | S | 22 |
| QU | KW | 3-5 | OU | OU | 9-11 | ! | FR | 15 |
| C | STK | 3 | OI | OI | 9-12 | $ | PB | 15 |
| G | TKPW | 4 | AU | AU | 10-11 | O | PL | 15 |
| EX | SR | 1-7 | AI | AI | 10-12 | H | BG | 16 |
| Y | KWR | 5 | UI | UI | 11-12 | GH | LG | 17 |
| J | SKWR | 5 | EE | EOA | 8-10 | N | LT | 17 |
| V | STKPW | 3 | OO | EOU | 8-9 | M | GE | 20 |
| N | TPH | 4 | EAU | EAU | 8-10-11 | TH | TD | 19-21 |
| M | STP | | EW | EUI | 8-11 | Y | DS | 21 |
| ( | STKPWHR | 3 | HYPHEN | OAU | 10 | SH | FPB | 13-16 |
| ? | STPH | 4 | IA | OAI | 9-10 | ING | PBLG | 15-16-18 |
| Z | KP | 4 | AW | AUI | 10-11 | K | LGTE | 20 |
| & | STPH-NB | 4 | OW | OUI | 9-11 | Z | RBG | 18 |
| L | HR | 7 | 11 | EOAU | 8 | X | BGE | 16 |
| ) | STKPWHR-NB | 3 | UNDERLINE | OAUI | 9 | OR | GEDS | 21-22 |
| 1 | S-NB | 1 | Y | EOAUI | 8 | J | RBGES | 18 |
| 2 | T-NB | 2 | 5 | A-NB | 10 | SE | BGES | 20-22 |
| 3 | P-NB | 4 | # | OAUI-NB | 9 | 6 | F-NB | 13 |
| 4 | H-NB | 6 | 3/4 | EOAU-NB | 8 | 7 | P-NB | 15 |
| | | | / | OAU-NB | 10 | 8 | L-NB | 17 |
| | | | | | | 9 | T-NB | 19 |
| | | | | | | 0 | D-NB | 21 |
| | | | | | | LF | FPLTD | 19-21 |
| | | | | | | TCH | PLTD | 15-19-21 |
| | | | | | | ATE | GTEDS | 18-19-20 |
| | | | | | | ST | LTD | 17-19 |
| | | | | | | V | PLT | 15 |
| | | | | | | ; | FRPB | 13 |
| | | | | | | : | FRPBLGTE | 13 |
| | | | | | | . | FPLT | 19 |
| | | | | | | , | RBGE | 18 |
| | | | | | | ¢ | FP | 13 |
| | | | | | | * | FRPBLGTE-NB | 13 |
| | | | | | | % | PB-NB | 15 |
| | | | | | | 1/4 | FR-NB | 13 |
| | | | | | | 1/2 | FRPB-NB | 13 |

Fig. 17.

| fig.1. | fig 2. | fig 3. |
|---|---|---|
| fig 4. | fig 5. | fig 6. |
| fig 7. | fig 8. | fig 9. |
| fig 10. | fig 11. | fig 12. |
| fig 14. fig 17. | fig 15. | fig 16. fig 13. |

INVENTOR
Edgar H Clark

June 13, 1933.  E. H. CLARK  1,913,831
TRANSLATING AND RECORDING DEVICE
Filed Jan. 16, 1928   15 Sheets-Sheet 15

INVENTOR.
Edgar H Clark

Patented June 13, 1933

1,913,831

UNITED STATES PATENT OFFICE

EDGAR H. CLARK, OF RICHMOND HILL, NEW YORK

TRANSLATING AND RECORDING DEVICE

Application filed January 16, 1928. Serial No. 246,992.

This invention relates to an improved printing or recording device.

It is the principal object of the invention to provide an arrangement capable of very high speed of operation, so that a printing or recording device, such as a typewriter for example, may be operated at a speed equivalent to the rate attained by the fastest form of stenography. The advantage of an arrangement of this kind is obvious, inasmuch as it allows of high speed dictation direct to the typewriter.

It is a further object of the invention to provide a device capable of simultaneous control over any desired number of printing devices. In this way any number of original copies may be produced simultaneously.

While the invention has been disclosed and will be described in combination with a typewriter, it is to be understood that the invention is not to be limited by the disclosure, as the inventive idea is capable of a variety of expressions, as for example, in the control of a linotype machine, or printing telegraph.

An understanding of the invention may be had from the following description and appended claims, reference being had to the drawings.

Fig. 1 shows the "In" allotter with various register relays.

Fig. 3 shows a controlling keyboard.

Fig. 4 shows initial relays for the translating device.

Figs. 5 and 6 show final relays for the translator.

Fig. 7 shows miscellaneous translating relays.

Figs. 10 and 11 show test relays and connecting relays.

Fig. 12 shows the vowel relays.

Fig. 13 illustrates the typewriter keyboard.

Fig. 14 shows the various code combinations necessary to provide an arrangement capable of transmitting any form of intelligence.

The drawings when arranged as shown in Fig. 17 show so much of an organization of circuits and apparatus as is necessary to an understanding of the invention.

From the foregoing table, Fig. 14, it may be seen that the keyboard is a combination of a directly controlling keyboard and of a permutation keyboard in which a combination of keys may control the selection of a single letter. Since the keyboard may be used either to exercise direct control or may function as a permutation keyboard, it may properly be said to be a dual function keyboard.

It should be noted that while electromagnetic apparatus and suitable control circuits have been made use of in the particular embodiment of the invention disclosed, the invention is capable of development in other forms.

General description

Devices have hitherto been produced with a view toward the accurate reception of rapid dictation. A well known device of this character is shown in U. S. Patent No. 1,280,743, to W. S. Ireland, October 8, 1918. This device is successful in enabling its operator to take dictation at an extremely high speed, and records the subject matter in typed form in accordance with a special stenographic code. A device of this nature, however, solves only a part of the ultimate problem, since its record requires translation by means of human intelligence, with accompanying typing into complete and commonly intelligible form.

By means of the present invention a keyboard essentially similar to that shown in the above mentioned Patent No. 1,280,743 may be used with the attendant capability of very high speed of operation. An automatic translating and controlling device is supplied, by means of which the record is translated from stenographic to complete form, and a typewriter or other recording device is operated to record the subject matter in the form originally received by the operator.

Figure 16:
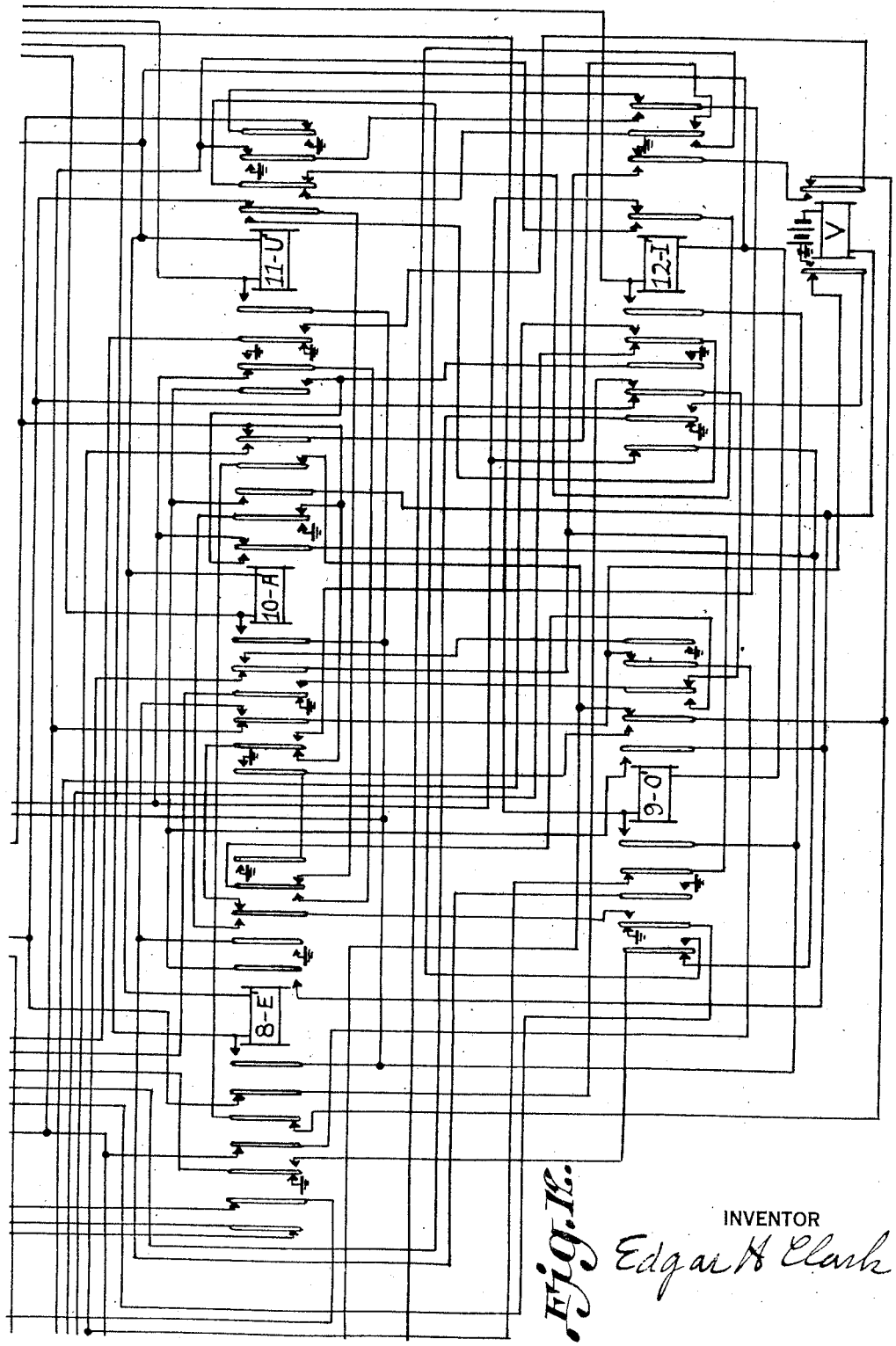
Fig. 16 is a simplified diagram illustrating the general plan of operation and the relation which the various parts of the organization bear to one another.

Referring now to Fig. 16, a manual controlling device, preferably a keyboard, is shown. Ten registering devices have been shown, and may be successively associated with the controlling device by means of an "In" progression switch. As many registering devices as are required may be supplied.

When a combination of keys is operated, the record is taken and locked on the register allotted by the progression switch, which then advances to assign a new register. After the last register has been set, the first one is again taken for use. Enough registers must be supplied so that there will always be one available.

The registers deliver their respective records to the recording, translating and automatic controlling device, with which they are successively associated by means of an "Out" progression switch, or allotter. As soon as a register has delivered its record to the translating device, such register is released and is available for receiving a new record from the keyboard, when associated therewith by means of the "In" progression switch.

When a record is received by the translating device, it translates such record into its original form, and causes it to be typed by means of an electromagnetically operated typewriter. As soon as this operation is completed, the "Out" progression switch advances to associate the translating device with the next register.

Referring now to Fig. 3, a brief description of the controlling keyboard will be given. The keyboard may be remotely placed with respect to the remaining apparatus if so desired.

The letters STKPWHR are to be operated by the fingers of the left hand and are known as the initial consonants. The letters EOAUI are the vowels and may be operated by the thumbs of both hands. The letters FRPBLGTEDS are the final consonants and are to be operated by the fingers of the right hand. The above letters read and are recorded in the order given.

The keys may be simultaneously operated at one stroke. It is this simultaneous operation of the keys which makes possible the great speed of the device, as is obvious when the method is compared to ordinary typing in which the keys are successively manipulated. The keys are of a non-locking type, by which is meant a key that returns to its normal position as soon as finger pressure is removed.

To record the word "skate", the letters S and K are operated by either one or two fingers of the left hand, the letter A and the space bar are operated by the thumb of either hand, and the letters T and E are operated by one finger of the right hand. A single stroke is required to record the complete combination. A simple word of this nature requires no translation. It will usually be necessary, however, to depress the keys in accordance with a code in order to record various letters, punctuation marks, etc. Fig. 14 shows a complete code in which the equivalents of the various combinations are indicated.

This code is developed from a practical study of the keyboard and its various possibilities. For example, the letters TPH can never be used as the start of any known word. This combination may therefore be assigned to any desired letter or symbol. In the present system, it is assigned to N when used as an initial consonant. The combination TPH is translated to cause the typewriter to print N, as will be subsequently described.

The various special keys shown in Fig. 3 are used to automatically control movement of the carriage, spacing, etc.

The circuits from the keys terminate in movable contacts of the "In" allotter as indicated in Fig. 16.

It is believed that the printing can be accomplished faster than the operator can set the registers. However, if for any reason he should get far enough ahead of the printer so that no register is available, he will be apprised of this condition by means of a "busy" lamp associated with each register.

Other lamps are provided for various signaling purposes, as will be subsequently described.

After a record has been received by the first register, a short delay is introduced to allow the operator to make a correction when necessary. This delay is produced by making the printing operation for the first register await the setting of the second register. In case correction is necessary, the operator may accomplish it by means of a wipe-out key.

Upon the termination of dictation, sufficient time for wipe-out is introduced, after which the last word is printed.

Each register consists of one relay for each letter key on the keyboard. Miscellaneous control relays are provided for taking the record from the various auxiliary keys.

After the first register has been positioned, the record is transmitted to the translator, which also has a relay for each letter key and miscellaneous control relays.

Figure 15:
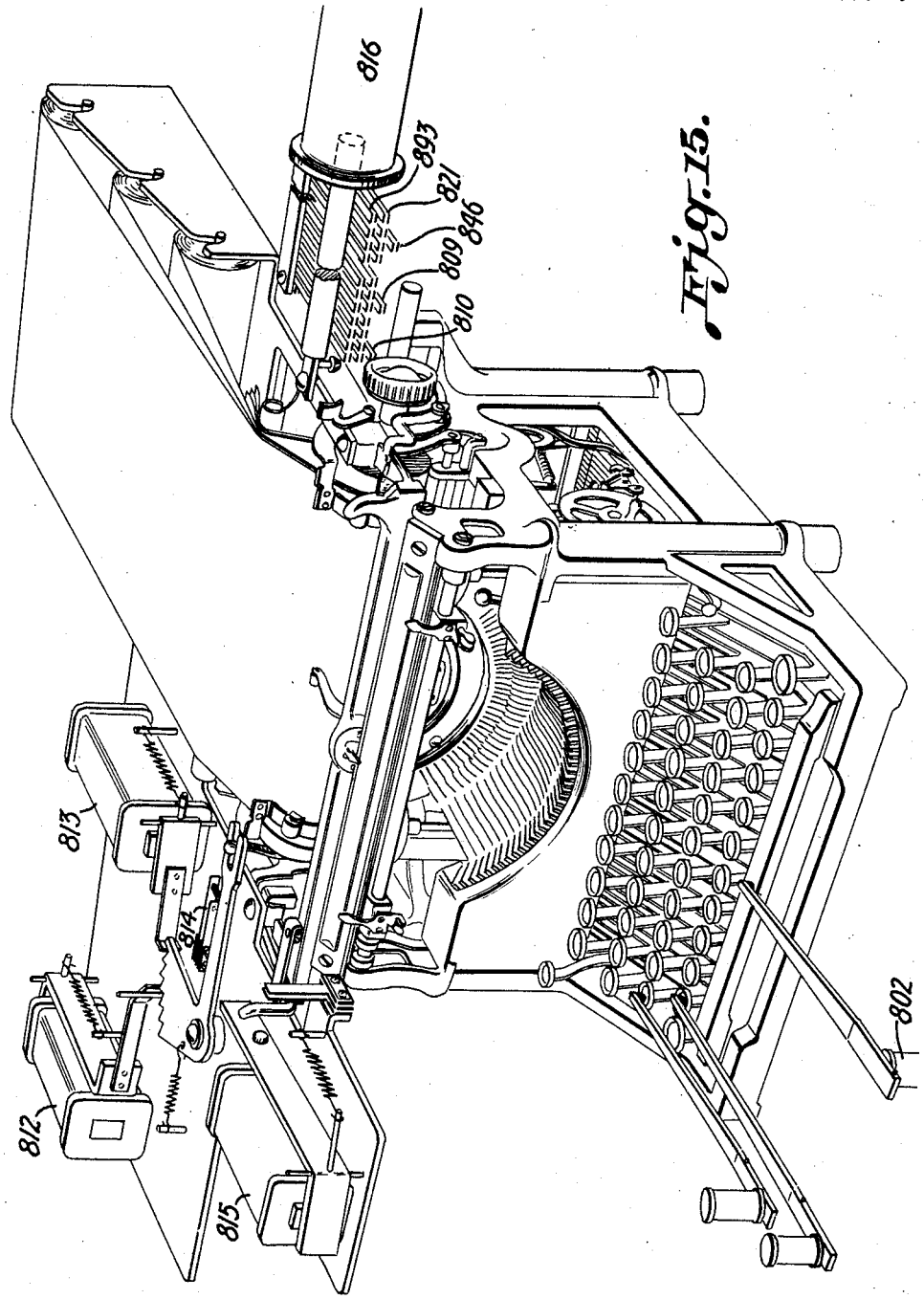
Fig. 15 illustrates automatic controls for use in combination with an ordinary typewriter of standard make.

After the translator has received the record for a word or syllable, 22 conductors corresponding to the 22 letter keys are tested. This is done by means of 22 pairs of test relays. The conductors, corresponding to keys that should not operate, are grounded, and the associated test relays energize. The conductors corresponding to letters to be printed are then connected in suitable circuits to cause the operation of electromagnets controlling the typewriter operation, as indicated in Fig. 15.

After the testing relays have had time to operate, ground is placed on the printing conductor and is extended through contacts of operated test relays in succession from left to right. At the first unoperated test relay, the printing conductor is extended to the corresponding printing magnet. The magnet in operating operates one of the test relays, which in turn releases the magnet, thus causing the operation of the other relay of the pair. The printing conductor is then extended to contacts of the next pair of unoperated test relays, whereupon a printing operation again takes place. This process is continued until the printing conductor has been extended through all the test relays, whereupon the allotter is advanced to associate the translator with the next register.

In many cases words may be registered in several ways. Thus the word "skate" may be recorded with spacing, at a single stroke, or it may be recorded a letter at a time, as on the ordinary typewriter. It may also be recorded as a result of several operations, each of which registers part of the word. It should be noted that the proper sequence of the letters from left to right must be maintained regardless of which method is used.

A few of the large number of words which may be recorded at a single stroke are included in the following list: groin, chair, yearn, snatch, swear, swore, sphere, wreath, blond, speed, what, exact, float, fifth, breast, bread, cold, maid, raid, snore, exit.

The word "frock" obviously cannot be recorded in a single stroke since in the concluding letters C=PL and K=LGTE, so that an overlap of letters is produced.

Referring to Fig. 13, it will be noted that the designation @ has been omitted. This symbol is ordinarily used in place of the word "at". In the present system the word "at" may be recorded at a single stroke, so that no saving would be introduced by the use of the abbreviation symbol.

The exclamation point has also been omitted from the keyboard, and no combination has been assigned to this particular punctuation mark, inasmuch as it cannot be recorded at a single stroke. On the ordinary typewriter, in printing the exclamation point, it is necessary to use the period, then the backspace, and then the single quotation mark. The same slow process would be required in this system, and it is felt that the period may be used during dictation, and that the quotation mark may be supplied later from an ordinary typewriter. It is also recognized that the exclamation point is very seldom used in normal dictation.

A detailed description of the operation of the device will now be given.

It will be assumed that the words "the gem" are to be printed. Including the necessary spacing, these words require 8 strokes on the ordinary typewriter. In the present system, they may be recorded in two strokes. The first stroke includes the space and the letters THE. The second stroke includes the space and the letters TKPWEGE, in which TKPW=G (initial) and GE=M (final).

Before beginning operations it is necessary to depress one of the locking keys 723, 724 or 725. These keys control the line spacing, and when depressed remain in that condition, thus giving the operator an indication of the spacing being used. Key 723 is used for single spacing, key 724 for double spacing and key 725 for triple spacing. It will be assumed that double spacing is desired. Key 724 will therefore be depressed.

The depression of key 724 causes the space control switch (Fig. 8) to move to position 2, provided it was not already in that position. If we assume that the control switch was in position 3 at the time key 724 is depressed, a circuit is completed for the return magnet 813. This circuit extends from grounded battery, winding of magnet 813, brush No. 1 and its third contact, lead 726, and contact of key 724 to ground. Magnet 813 is energized and locks in a circuit through its armature and contact to ground at an off-normal switch 814. The energization of magnet 813 releases a holding pawl and allows the control switch to return to its normal position, whereupon the off-normal contact 814 is opened and magnet 813 deenergizes.

The control switch is mechanically of a construction well known in the art of automatic telephony and needs no detailed disclosure or description. Contact arms are provided and arranged for motion into successive engagement with contacts arranged in an arcuate terminal bank. A ratchet and pawl mechanism, electromagnetically operated, acts as a motor for the device. Motion is against spring tension, and return movement at the end of each step is prevented by the holding pawl controlled by magnet 813. In addition to the brushes, the switch actuates a lever which controls the spacing device on the typewriter (Fig. 15) and causes it to assume a desired one of its three positions in accordance with the setting of the control switch.

When the control switch reaches its normal position, a circuit for stepping magnet 812 is completed from grounded battery, winding of magnet 812, armature and back contact of magnet 812, brush No. 2 and its associated first contact, lead 727, and contact No. 4 of key 724 to ground. Stepping magnet 812 is energized and interrupts its own circuit to advance the switch to position 2. In this position no circuit for the magnet 812 is found, and the switch therefore remains in this position.

The movement of the control switch to position 2 moves the space lever on the typewriter to position 2, which is the position for double spacing. Had key 723 been depressed, the control switch would have been brought into position 1 and the typewriter space lever would have been brought into position for single spacing. Similarly, key 725 prepares the typewriter for triple spacing.

The operation of the keys THE and space bar 28 causes the operation of relays 2T, 6H, 8E and space relay 10 in the first register.

The "In" allotter switch is shown in Fig. 1 together with miscellaneous control relays for the two registers.

Only so much of the method of interconnecting the keys and registers has been shown as is necessary to an understanding of the invention. The key T indicated at 30 is the only key whose contacts are shown connected to the allotter and the registers, and this key is shown for use with only two registers. It is to be understood, however, that as many registers may be provided as are required for the proper operation of the system.

The number of registers required will depend on the speed of the operator and the speed at which printing takes place. Enough registers must be provided to allow the operator to make strokes while the typewriter is undergoing various miscellaneous operations, such as automatically moving to a new page position.

The "In" and "Out" allotters in the present disclosure are arranged for cooperation with ten registers, and move over contacts corresponding to these registers in sequence. Since the wiring of only two registers has been shown, the present disclosure has been arranged to cause the allotters to move from their second positions, over the remaining positions without stopping, and thus back to the first position. This is accomplished for both allotters by means of self-interrupting circuits for their respective stepping magnets as will be described hereinafter.

The allotters are mechanically so arranged that they will engage their first position contacts on the completion of the step which moved their brushes from engagement with the tenth position contacts.

The circuit for relay 2T may be traced from ground at the allotter switch, the No. 1 allotter brush and its first contact, conductor 2, contact 6 of key T, conductor 4, winding of relay 2T, conductor 5, winding of low resistance battery feed relay 6, to battery and ground.

Relay 2T is energized and locks in a circuit through its armature and contact, conductor 8, right armature and back contact of release relay 9, to ground. Relays 6H, 8E and relay 10 are operated in a similar manner, by means of contacts (not shown) controlled by the H and E keys and by the space bar 28. Relay 6 is energized in series with the above relays, and completes an obvious circuit for lamp 28 at its outer right hand armature. Whenever a register is in use, a battery feed relay corresponding to relay 6 is energized and a lamp corresponding to lamp 28 is lighted. The position of these lamps with respect to the keyboard may be seen in Fig. 3, where the lamps are designated "register lamps". Thus the operator may rapidly note how many registers are idle and at whate rate they are being discharged. This information enables him to properly regulate the speed of operation of the keyboard. When all registers are busy, a chain circuit for lamp 29 extends from grounded battery, lamp 29, outer left-hand armatures and contacts of the battery feed relays (each energized while its associated register is in use) in succession and to ground at the armature of the battery feed relay associated with the final register. The lighting of lamp 29 informs the operator that all registers are busy and that he has encountered a register which is not yet ready for use.

Contact 1 of key T energizes allotter magnet 11 in a circuit from grounded battery, winding of magnet 11, to ground. The allotter is a simple step-by-step switch and is arranged to advance upon deenergization of the magnet. When the keys are released, magnet 11 is deenergized and the allotter brushes are advanced into engagement with the second contact set, in which position the second register set is made operative. It should be noted that each key has a contact corresponding to contact 1 of key T, so that the allotter may be controlled whenever any key is depressed.

The second register is now set by depressing keys TKPWEGE, corresponding to the word "gem". The record is taken in a manner similar to that described for the first register. The relays for the second register have not been shown, as it is believed that they would merely serve to complicate the disclosure, inasmuch as they are identical with those shown for the first register. The second operation of the key set causes the energization of relays in the second register corresponding to relays 2T, 3K, 4P, 5W, 8E, 18G and 20E of the first register. The battery feed relay 14 and the space relay 30 of the second register are operated.

The fact that a record has been taken by the second register indicates that no corrections in the first record are to be made. Translation and printing of the first record may therefore proceed.

The multi-contact relay 101 is now operated in a circuit from grounded battery, winding of relay 101, conductor 15, right armature and contact 1 of relay 14, conductor 16, left contact and armature 2 of relay 6, conductor 17, contact and brush 2 of the out allotter, to ground. It will be assumed that the out allotter is in position 1, in which position connections are extended to the first register.

Relay 101 extends circuits from contacts of each relay in register 1 to the windings of corresponding relays in the translator circuit. Corresponding relays have been correspondingly designated, with the prime applied to the translator relays for discriminating purposes.

The energization of relay 101 causes the record on the first register to be transferred to the translator relays, 2T′, 6H′, (Fig. 4) relay 8E′ (Fig. 12), and space relay 703 (Fig. 7). The circuit of relay 2T′ may be traced from grounded battery, winding of battery feed relay 701, conductor 702, conductor 401, winding of relay 2T′, conductor 402, conductor 19, conductor 102, contact and armature 6 of relay 101, conductor 104, inner right contact and armature of relay 2T to ground. It is to be noted that battery feed relay 701 is energized in series with any of the translator register relays which is energized.

Figure 2:
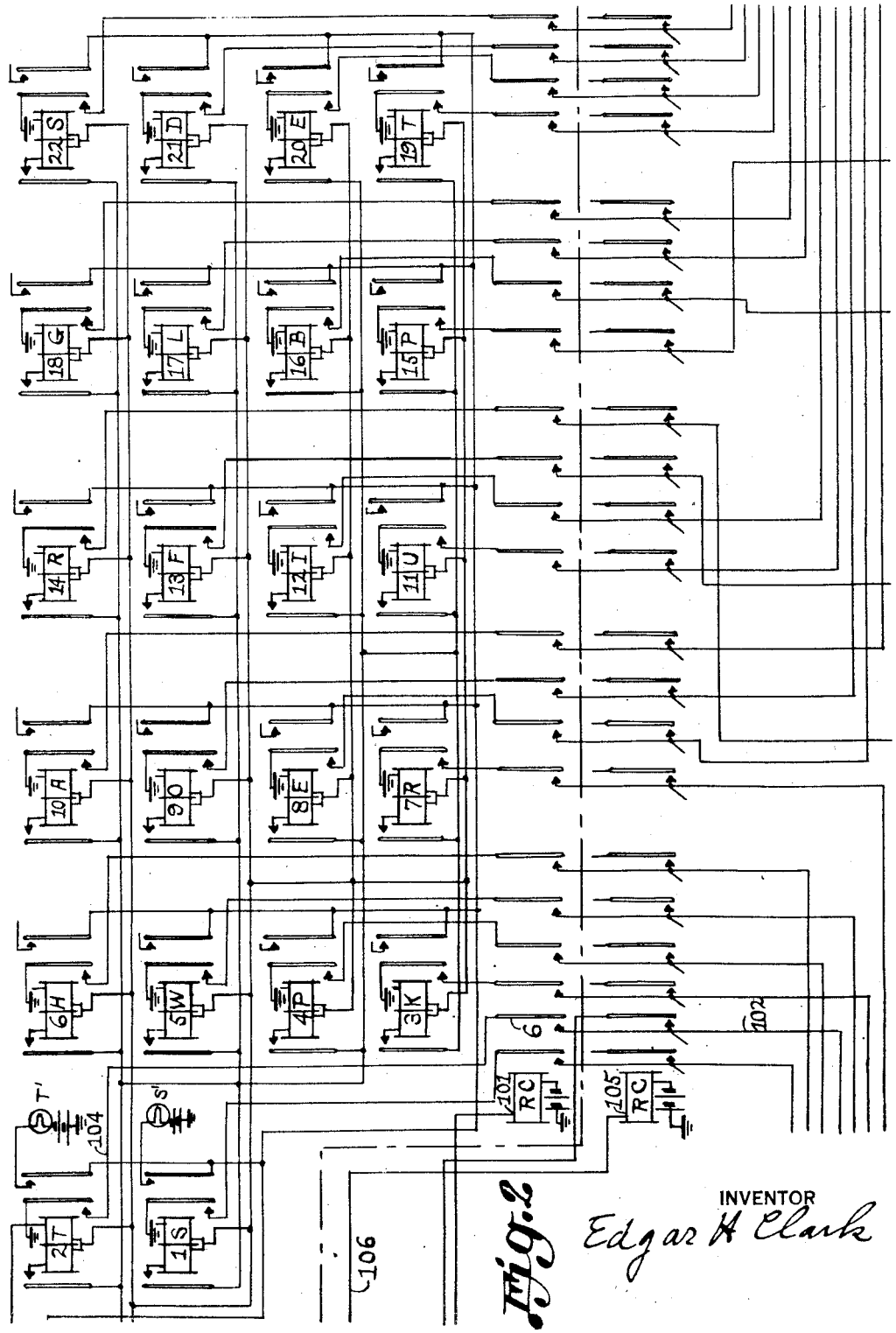
Fig. 2 shows register relays.

The energizing circuits for relays 6H′, 8E′, and 703 are believed to be obvious and need not be traced in detail. It should be noted that the contacts appearing in the lower right-hand corner of Fig. 1 are controlled by relays 101 and 105 of Fig. 2.

As soon as the record is registered in the translator, a circuit is completed from grounded battery, winding of translator control relay 1001 (Fig. 10), conductor 1002, conductor 704, left front contact and armature of relay 701 to ground.

Figure 10:
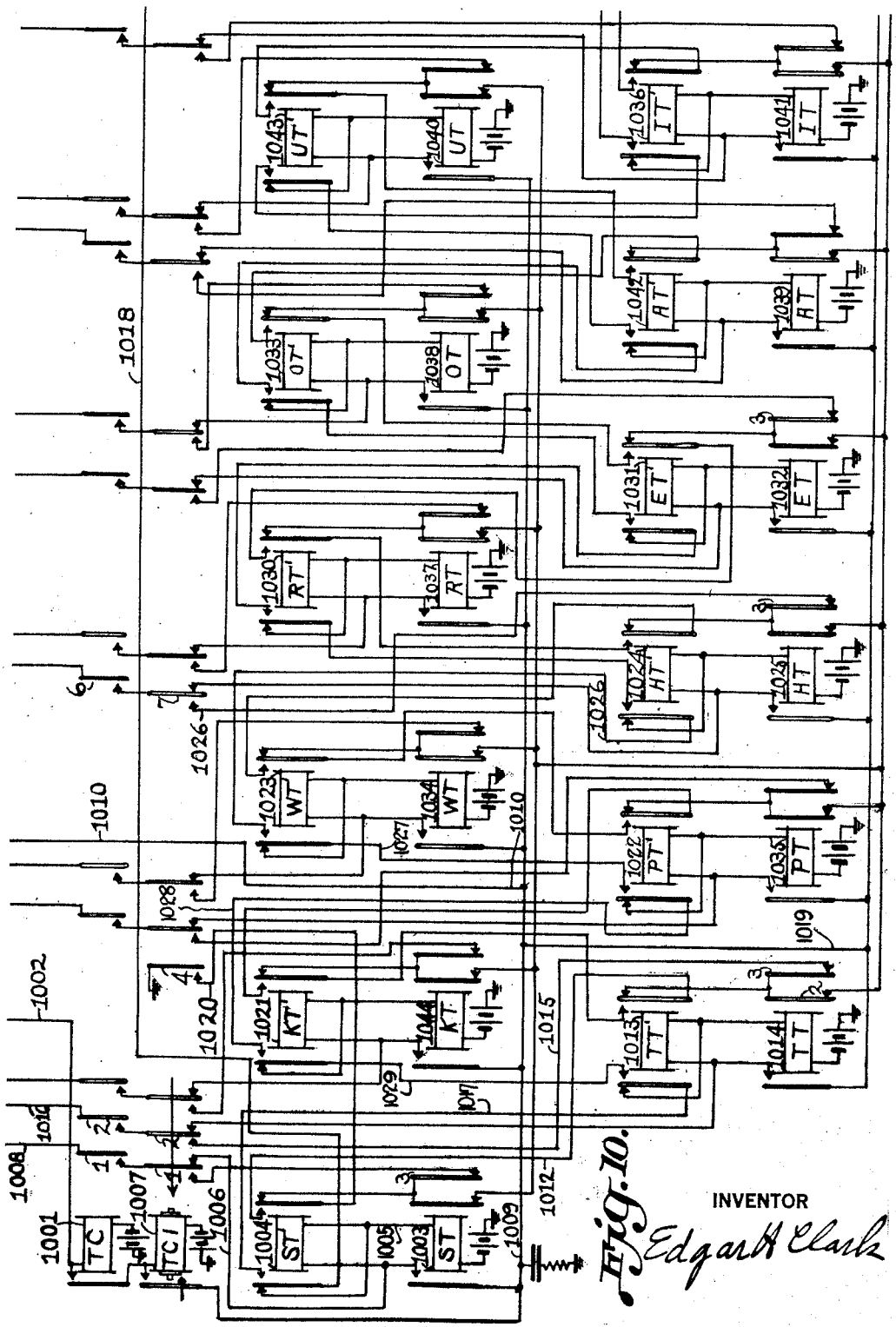

Relay 1001 is a multi-contact relay and controls a row of contacts shown in Figs. 10 and 11, to connect 22 pairs of test relays to 22 test conductors extending to translator relays. These test relays determine the particular letters to be printed.

In printing the word THE no translation is required, since the letters to be printed correspond to the keys depressed.

The energization of relay 1001 causes the energization of all the test relay pairs, with the exception of the pairs 1013, 1014, 1024, 1025, 1031 and 1032.

The circuit for relays 1003 and 1004 (corresponding to the letter S) may be traced from grounded battery, winding of relay 1003, conductor 1005, winding of relay 1004, conductor 1006, back contact and armature 1 of relay 1007, front contact and armature 1 of relay 1001, conductor 1008, conductor 704, conductor 403, armature 2 and back contact of unoperated relay 1S′ to ground. Relays 1003 and 1004, upon energization, lock in a circuit through the left armature and front contact of relay 1003, conductors 1009, 1010, 705 and 801, back contact and armature 3 of relay 802, conductors 803 and 706, right armature and back contact of relay 707 to ground.

Other test relays 1021, 1044, 1022, 1035, 1023, 1034, 1030, 1037, 1033, 1038, 1042, 1039, 1043, 1040, 1036, 1041, 1101, 1115, 1102, 1116, 1103, 1117, 1104, 1118, 1105, 1119, 1106, 1112, 1107, 1120, 1108, 1113, 1109, 1121, 1110 and 1122 are energized and locked in circuits similar to those just traced for relays 1003 and 1004.

It is obvious that with the translator relays 2T′, 6H′ and 8E′ energized, the corresponding pairs of test relays 1013, 1014, 1024, 1025, 1031 and 1032 cannot be energized.

To allow time for the test relays to operate and lock, the relay 1007 is made slow to operate. The circuit for relay 1007 may be traced from grounded battery, winding of relay 1007, left armature and front contact of relay 1001, conductor 1002, conductor 704, left front contact and armature of relay 701 to ground.

When relay 1007 operates, it places ground potential on the printing lead 1020, thus operating the magnet which controls the typing of the letter T, in a circuit from ground, armature 4 and contact of relay 1007, conductor 1020, right armature and front contact of relay 1004, conductor 1012, right armature and back contact of relay 1013, armature 3 and back contact of relay 1014, conductor 1015, armature 2 and front contact of relay 1007, armature 2 and front contact of relay 1001, conductor 1016, conductor 707, conductor 404, armature 6 and front contact of relay 2T′, conductor 405, armature 10 and back contact of relay 4P′, conductor 406, armature 7 and back contact of relay 3K′, conductor 407, conductor 501, conductor 804, armature 4 and back contact of relay 805 to the conductor designated T, which extends through the winding of the typewriter magnet controlling the letter T to grounded battery.

Figure 8:
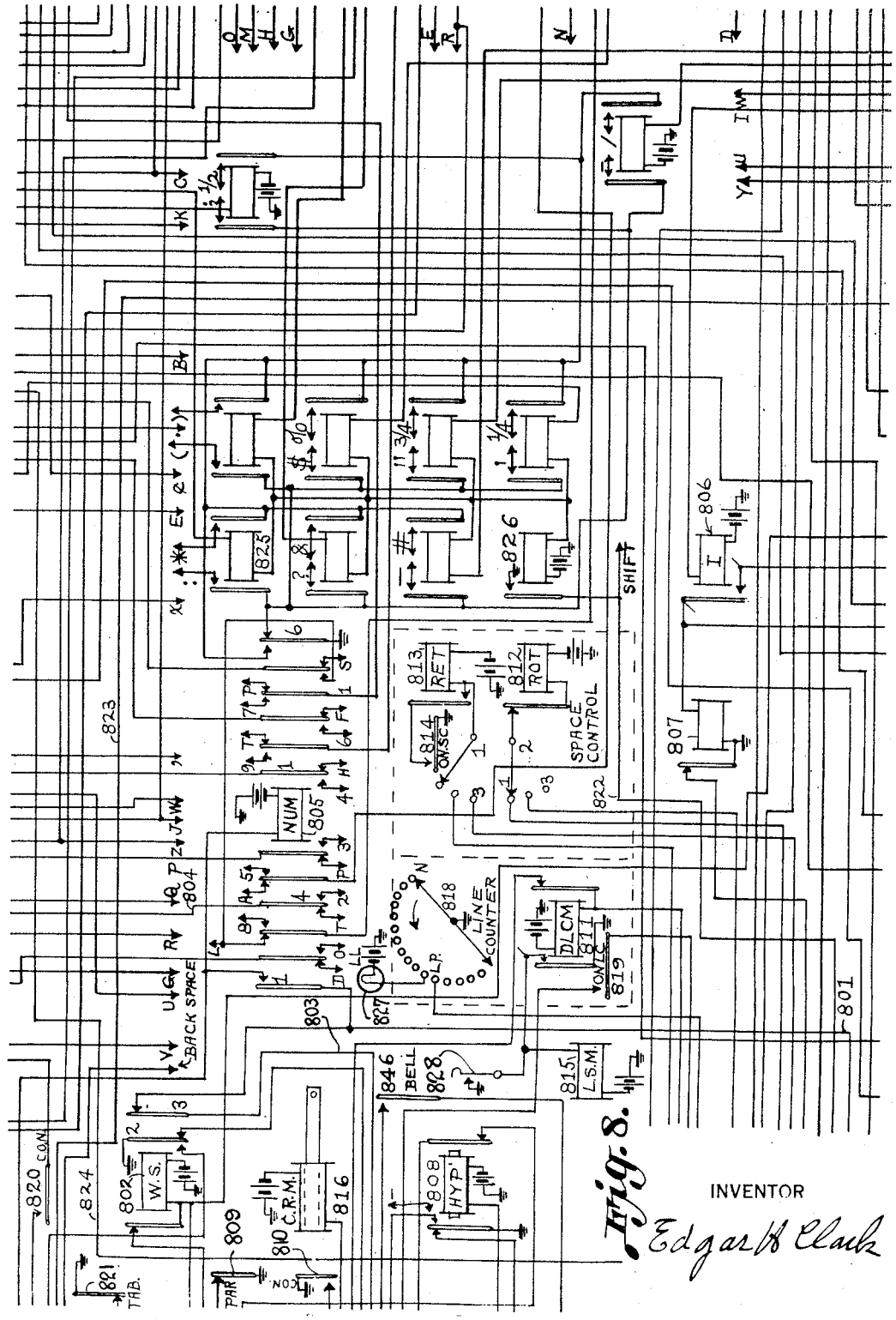
Fig. 8 shows various relays and magnets for controlling the operation of the typewriter.
Figure 9:
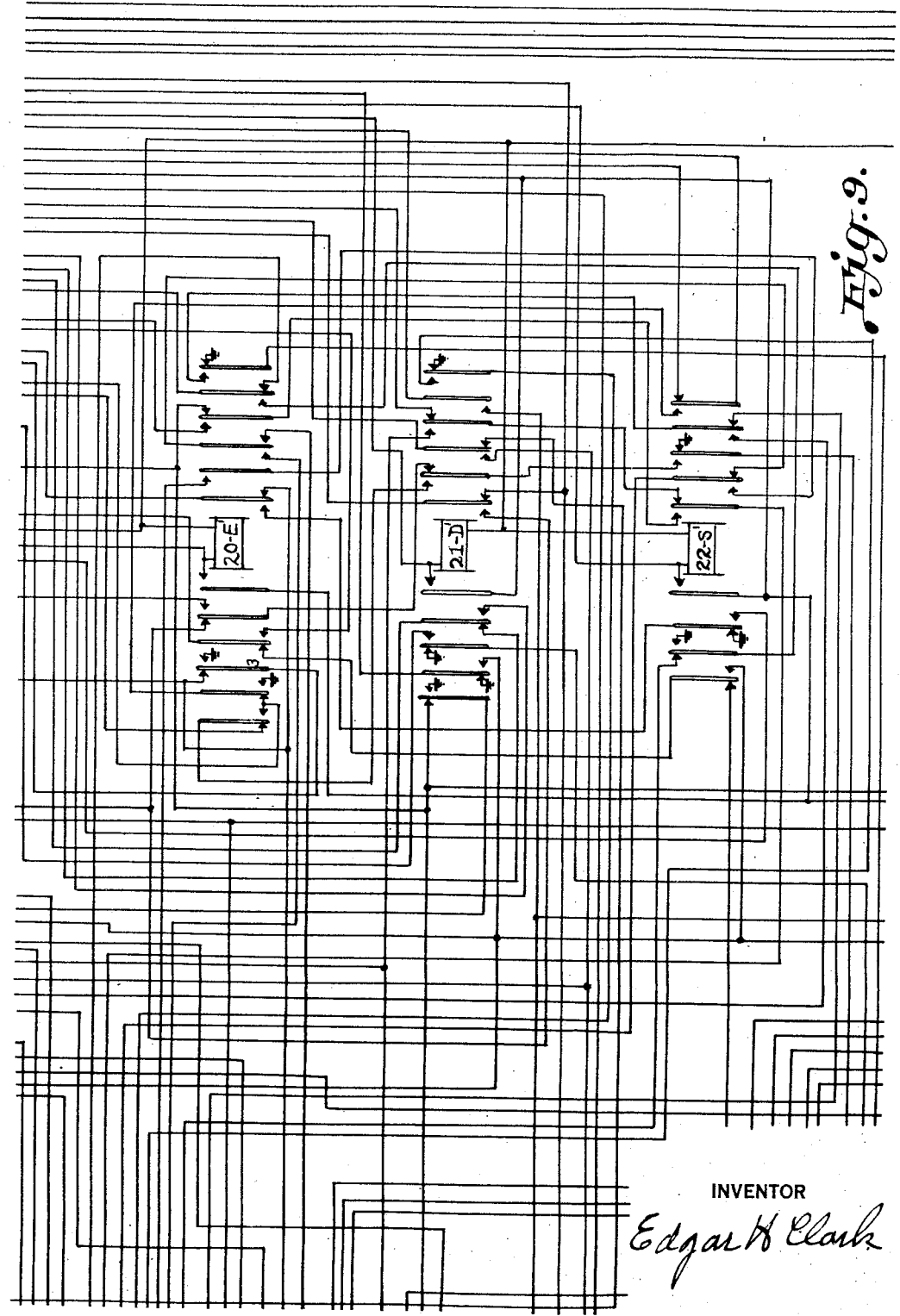
Fig. 9 shows the remaining final relays for the translator.

Only one of the key-operating magnets has been shown in Fig. 8, and that one is designated 806 and controls the typing of the letter I. It is to be noted that each of the key-operating magnets controls an armature and contact like the one shown on the drawing for magnet 806. It should be further noted that these armatures and contacts are all connected in multiple, so that whenever a key-operating magnet is energized, a circuit is completed across the conductors shown as terminating in the armature and contact of magnet 806. The multiple connection is indicated on the drawings.

The operation of magnet T completes a circuit from grounded battery, winding of relay 1014, left armature and back contact of relay 1013, conductor 1017, left armature and front contact of relay 1004, conductor 1018, armature and front contact of magnet T, winding of relay 807, to ground. It will be remembered that the armature and contact of magnet T are respectively connected in parallel to the armature and contact of magnet I (806) shown in Fig. 8 as indicated by the conventional branched conductors associated with said magnet I. Relay 807 is operated, but performs no useful function at this time. Relay 1014 also operates and opens the circuit of magnet T. Magnet T is slow enough in releasing to insure the complete energization of relay 1014. Relay 1014 completes a locking circuit for itself, including the winding of relay 1013, left armature and front contact of relay 1014, conductor 1019, conductor 1010, conductor 705, conductor 801, back contact and armature 3 of relay 802, conductor 803, conductor 706, armature and back contact of relay 707 to ground. It should be noted that relay 1013 does not operate until magnet T deenergizes, as the winding of relay 1013 is shunted by the direct ground controlled by said magnet.

With relay 1013 energized, the printing conductor 1020 is extended to control key-operating magnet H. The grounded printing conductor 1020 is extended to the right armature of relay 1013, as previously traced, and thence over its front contact, right armature and front contact of relay 1021, right armature and front contact of relay 1022, right armature and front contact of relay 1023, right armature and back contact of relay 1024, armature 3 and back contact of relay 1025, conductor 1026, armature 7 and front contact of relay 1007, armature 6 and front contact of relay 1001, conductor 708, armature 2 and front contact of relay 408, conductor 410, armature 5 and back contact of relay 409, conductor 411, armature 1 and back contact of relay 412, conductor 502, armature 1 and back contact of relay 805 to conductor H, which extends to grounded battery through the winding of key-operating magnet H. The magnet H is energized and causes the typing of the letter "H". Magnet H also completes a circuit from grounded battery, winding of relay 1025, left armature and back contact of relay 1024, conductor 1026, left armature and front contact of relay 1023, conductor 1027, left armature and front contact of relay 1022, conductor 1028, left armature and front contact of relay 1021, conductor 1029, left armature and front contact of relay 1013, and thence to ground through the winding of relay 807 as previously traced, except that in the present case the circuit is completed at contacts controlled by magnet H.

Relay 1025 opens the circuit for magnet H, which releases and removes the shunt from the winding of relay 1024, which then energizes in the locking circuit of relay 1025. This circuit extends from grounded battery, windings of relays 1025 and 1024, left armature and front contact of relay 1025, conductor 1019, and thence to ground, as previously described.

With relay 1024 energized, the printing conductor is extended by way of the right armature and front contact of relay 1024, right armature and front contact of relay 1030, right armature and front contact of relay 1031, armature 3 and back contact of relay 1032, thence to the key-operating magnet E over a circuit which may be readily traced in view of the previous description in connection with the printing of letters "T" and "H". Magnet E causes the typing of the letter "E" and causes the energization of relays 1032 and 1031.

The printing conductor is now extended by way of the front contact of relay 1031 and armatures and front contacts of relays 1033, 1042, 1043, 1036, 1101, 1102, 1103, 1104, 1105, 1106, 1107, 1108, 1109, 1110, conductor 1111, conductor 823, conductor 723, right armature 1 and back contact of relay 709, winding of relay 710 to grounded battery.

Relay 710 operates and causes in turn the operation of the outgoing allotter magnet 23 in a circuit from grounded battery, winding of magnet 23, conductor 718, right-hand armature and back contact of relay 717, conductor 716, right-hand armature and back contact of relay 808, armature 4 and back contact of relay 715, armature 3 and back contact of relay 714, conductor 713, left armature 1 and front contact of relay 710, conductor 712, left armature 2 and back contact of relay 711 to ground. The magnet 23 in operating completes a circuit for word space magnet 802. This circuit may be traced from grounded battery, winding of magnet 802, armature 3 and back contact of relay 711, conductor 719, right armature 2 and back contact of relay 709, conductor 720, left front contact and armature 1 of relay 703, conductor 721, contact 2 and armature of magnet 23 to ground. Magnet 802 operates the typewriter space bar and also completes a circuit for register release relay 9. This circuit may be traced from grounded battery, winding of relay 6, left winding of relay 9, first contact and brush 1 of the out allotter switch, conductor 24, armature 2 and front contact of relay 802 to ground.

Relay 9 releases relays 2T, 6H, 8E and 10 (Fig. 1) in the first register. Magnet 802 opens the circuits of the twenty-two pairs of test relays (Figs. 10 and 11) and of relays 2T', 6H', 8E', space relay 703 and battery feed relay 701. Relay 701 opens the circuit of relays 1001 and 1007. The test relays in releasing open the circuit of release relay 710, which in turn causes the release of allotter magnet 23. The allotter magnet causes the release of relay 802. The space relay 703 is slow in releasing to prevent a false operation of release relay 707, which is used for releasing when a syllable only is recorded, and no spacing is required when the out allotter is advanced. If the space relay 703 had not been operated, the advance of the out allotter would have energized release relay 707 instead of the space magnet 802. Relay 707 would have brought about release in the same manner as that just described in connection with relay 802, since their contacts are in series.

The out allotter advances when the magnet 23 deenergizes. The first register is now ready for the receipt of a new record, but since only two words are to be recorded in the example used, this register remains inactive.

Ordinarily the record is not transferred from the second register until the next register (with the arrangement shown in the drawing this is first register) has been positioned or set. Since the first register has not been repositioned it is necessary to wait for the operation of the slow-acting timing relay 24. When relay 24 operates, it completes a circuit from grounded battery, winding of relay 105, conductor 106, right-hand armature and front contact of relay 24, armature 2 and front contact of relay 14 (Fig. 1) to ground at brush 2 of the allotter switch, now in its second position. Conditions have now been prepared for the transfer of the record from the second register to the translator.

The following relays are now operated in the translator by means of circuits similar to those previousy described in connection with the transfer from the first register: 2T′, 3K′, 4P′, 5W′, 8E′, 18G′ and 20E′.

The twenty-two pairs of test relays are now brought into operation. Since TKPW is the code corresponding to the letter G, it follows that the circuits must be so arranged that three of the associated pairs of test relays must operate. As a result, relays 1013, 1014, 1021, 1044, 1023 and 1034 are operated, while relays 1022 and 1035 do not operate. Of the remaining relays, 1031 and 1032 do not operate, but relays 1106 and 1112 are operated. Relays 1108 and 1113 and the remaining relays do not operate. The operating circuits for the testing relays that do operate may be traced in a manner similar to that previously described for the printing of the first word. Upon energization, the test relays complete locking circuits for themselves.

Relays 1001 and 1007 are now operated by means of circuits similar to those previously described. Relay 1007 applies ground potential to the printing conductor 1020 to operate the key-operating magnet G. This circuit is similar to that traced for the letter T of the previous word, except that in this instance the first pair of unoperated test relays encountered is 1022 and 1035, instead of relays 1013 and 1014.

The operation of the magnet operates relay 1035. Relay 1035 causes the release of magnet G which allows relay 1022 to operate in the locking circuit of relay 1035 in a manner readily understood in view of the previous description.

Relay 1022 extends the printing conductor 1020 for the typing of the next letter, which is E. The circuit for magnet E extends by way of back contacts of relays 1031 and 1032. Magnet E operates relay 1032, which in turn causes the release of magnet E, whereupon relay 1031 is energized to extend the printing conductor to the next pair of unoperated test relays, which is relays 1108 and 1113. The next key-operating magnet to be energized is magnet M, the circuit of which is completed at back contacts of relays 1108 and 1113. Magnet M operates relay 1113, which in turn causes the release of magnet M, whereupon relay 1108 is energized in the locking circuit of relay 1113.

From this point, the action corresponds to that previously described. That is, after the spacing operation, the various relays and magnets are released.

All of the various combinations shown in Fig. 14 may be translated and typed in a manner similar to that just described, and all regular typing is accomplished in this manner. For example, the translation of the letter V from the code designation STKPW is as follows. The first five pairs of test relays would normally not be operated since the designation involves the first five letters. However, as only one letter is to be printed, four of the five pairs of test relays are operated to cancel any printing on the associated leads. In this case, all the relays excepting 1021 and 1044 are operated. As a result, conductor 1020 is extended to lead 3, as indicated on the table in Fig. 14. The lead 3 is then extended through the relay combination in a manner to complete a circuit of the key-operating magnet V.

In case two letters are to be typed in succession, as EE, a special designation is necessary, in this case EOA. In this case leads 8 and 10 are used in succession, and the lead 9, which would normally correspond to the letter O, is cancelled.

The manner in which paragraphing is accomplished will now be described.

*Paragraphs*

When it becomes necessary to start a new paragraph and the last word of the preceding paragraph has been recorded, the paragraph key 26 is depressed and a record is taken by a register in a manner similar to that described for the letter keys.

It will be assumed that the first register is allotted. The operation of paragraph key 26 completes a circuit for relay 25, which energizes and locks to ground at the back contact of relay 9. Relay 101 is now energized in a circuit similar to the one previously described and extends through the contacts of relays 30 or 14. Relay 101 completes a circuit for transferring the record from the first register to the translator as previously descibed. Relay 711 in the translator is energized and locks to a contact controlled by the typewriter carriage and arranged to be closed in all positions of the carriage except the paragraph starting position. This contact is shown on Fig. 8 at 809. The locking circuit for relay 711 may be traced from grounded battery, winding of relay 711, right-hand armature 1 and its front contact to ground at contact 809. Relay 711 operates the end-of-line relay 714 in a circuit traceable from grounded battery, winding of relay 714, right-hand armature and back contact of relay 721, left-hand armature and back contact of relay 722, left-hand armature 1 and front contact of relay 711 to ground. Relay 711 also completes a circuit for relay 710 from grounded battery, winding of relay 710, right-hand armature 1 and back contact of relay 709, conductor 723, left-hand armature 2 and front contact of relay 711 to ground. Relay 714 locks to a contact that is closed when the carriage is in its off-normal position. This locking circuit extends from grounded battery, winding of relay 714, right-hand armature 1 and front contact of relay 714 and thence to ground at off-normal contact 810.

The operation of relays 710 and 714 completes a circuit for the double line-spacing magnet 811 from grounded battery, winding of magnet 811, conductor 728, left-hand armature 2 and front contact of relay 714, left-hand armature 1 and back contact of relay 715, contact 819, contact and arm 2 of the double spacing key 724, right-hand armature 2 and front contact of relay 710 to ground. The contact 819 is opened when the spacing magnet has completed its stroke.

Magnet 811 also controls the advance of a stepping switch of the type used in machine switching telephone systems. The switch is used to count the lines typed to provide a means of determining when a new page is to be started. The method of starting a new page will be described more completely at a later time.

Magnet 811 also completes a circuit for the line spacing magnet 815. This magnet is arranged to operate the line spacing lever on the typewriter which normally operates when the carriage is manually returned to the starting position. Since the typewriter had been arranged for double spacing, the operation of magnet 815 will cause the rotation of the paper roller a distance equivalent to two line spaces.

Relays 710 and 714 also complete a circuit for solenoid 816 which controls the return of the carriage. This circuit may be traced from grounded battery, winding of magnet 816, right-hand armature 2 and front contact of relay 714, right-hand armature 3 and front contact of relay 710 to ground. The operation of solenoid 816 returns the carriage to its normal position against spring tension. The carriage is locked in this position by a pawl in the usual manner. When the carriage moves to its normal position, the contact 809 is opened as the paragraph-start position is passed, but relay 711 does not deenergize since it is held in a locking circuit controlled at a front contact of relay 714. This circuit may be traced from grounded battery, winding of relay 711, right-hand armature 1 and front contact of relay 711, right-hand armature 4 and front contact of relay 714 to ground. When the carriage reaches its normal position, the off-normal contact 810 is opened to cause the release of relay 714. Relay 714 opens the circuits of magnets 816 and 811. The release of relay 714 also closes a self-interrupting circuit for word-space magnet 802 which then advances the carriage until the paragraph-start position is reached. The circuit of magnet 802 may be traced from grounded battery, winding of magnet 802, left-hand armature and back contact of magnet 802, right-hand armature 2 and front contact of relay 711, left-hand armature 1 and back contact of relay 714 to ground.

When the paragraph-start position is reached, contact 809 is opened, causing the release of relay 711, which in turn permanently opens the circuit of stepping magnet 802.

The allotter has been held in its first position and all typing has been held up until relays 714 and 711 deenergize. When these relays deenergize, allotter magnet 23 is energized in a circuit from grounded battery, winding of magnet 23, conductor 718, right-hand armature and back contact of relay 717, conductor 716, right-hand armature and back contact of relay 808, right-hand armature 4 and back contact of relay 715, right-hand armature 3 and back contact of relay 714, conductor 713, left-hand armature 1 and front contact of relay 710, which, being slow to release, remains momentarily energized after the release of relay 711, left-hand armature 2 and back contact of relay 711 to ground. When relay 710 releases, it opens the circuit of allotter magnet 23, causing the advance of the allotter. The regular typing may now proceed.

Numerals

In order to cause the typewriter to print numerals, it is necessary to depress the numeral bar 30. The operation of this bar in conjunction with one of the regular keys is necessary whenever a number is to be typed. The various equivalents are shown on Fig. 14. An inspection of this figure shows that initial consonant S depressed in conjunction with the numeral bar causes the typing of the numeral 1. The numerals 2, 3 and 4 are produced as a result of the depression of initial consonant keys T, P and H respectively. Vowel key A corresponds to numeral 5, and final consonant keys F, P, L, T and D correspond to numerals 6, 7, 8, 9 and 0 respectively.

The depression of the numeral bar 30 operates relay 31 in a circuit from grounded battery, winding of battery feed relay 6, winding of relay 31, to ground at a contact of key 30. Relay 31 completes an operating circuit for translator relay 805 from grounded battery, winding of relay 805, conductor 740, armature 1 and front contact of relay 101, right-hand armature and front contact of relay 31 to ground. Relay 805 locks in a circuit through its left-hand armature 1 and its front contact, armature 3 and back contact of relay 802, conductors 803 and 706, right-hand back contact and armature of relay 707 to ground. Relay 805 remains locked until all the relays in the translator for the corresponding record have been released. Relay 805 transfers the ten conductors corresponding to the letter keys discussed to magnets corresponding to the numerical designations set forth above. The conductor transferred from S to 1 is shown as operating the letter L since the small letter l on the typewriter is used for figure 1. The registration and control of the key operating magnets take place as previously described and should need no further description.

Carriage position indicating

The position of the typewriter carriage is indicated by lamps which are operated from a number of contacts distributed along the carriage at regular intervals. When the carriage is in its normal position the first contact is closed, and as the carriage moves from right to left, the lamp associated with the second position is closed before the circuit of the first lamp is opened. A lamp and contact are indicated in Fig. 3. These lamps serve to provide a visual indication that typing is progressing satisfactorily. The lamp controlling contacts are shown in Fig. 15 at 893.

It is of course obvious that other means may be used for indicating the position of the carriage, but the use of lamps has been illustrated as a convenient form of supplying this information.

End of line

The system is arranged to provide automatic advance when the end of a line is reached, and if no action to the contrary has been taken by the operator, the device will automatically split the word and insert a hyphen and then start a new line. In order to prevent hyphens being inserted in undesired places, it is necessary for the operator to watch the carriage progress lamps to determine the position of the carriage. When the carriage nears the end of the line, the operator should then depress one or more syllables at one stroke.

It will be assumed that keys for the last syllable of a word and the space key have been depressed, and that while the typing operation is taking place a contact is closed at a point corresponding to that at which the bell on the carriage is caused to ring. A contact for this purpose is shown on Fig. 15 at 846. The closure of this contact causes the operation of relay 714 in a circuit from grounded battery, winding of relay 714, right-hand armature and back contact of relay 721, left-hand armature and back contact of relay 722, left-hand armature 1 and back contact of relay 711, left-hand front contact and armature 2 of relay 703, which is operated due to the depression of the space key, carriage contact 846, left-hand front contact and armature of relay 701 to ground. It will be recalled that relay 701 is a battery feed relay and is energized whenever any of the register relays are operated, as was previously described. Relay 714 is energized and locks to the carriage off-normal contact 810, as previously described. When all of the letters have been typed in accordance with the record taken in the last stroke of the keys, relay 710 is operated in the usual way. This operates the carriage return magnet as previously completely described. Relay 710 also operates the double line counting magnet 811. Magnet 811 operates the line space magnet 815. When the carriage is returned to its normal position, contact 810 is opened, and the locking circuit for relay 714 is opened, and this relay deenergizes. Off-normal contact 820 is also opened at this time and causes the release of space relay 703. This is necessary in order to cancel the operation of the space magnet in this particular condition in order to keep the carriage at the beginning of the new line. The release of relay 714 releases carriage return magnet 816 and magnet 811.

The advance of the allotter and the typing operation have been delayed awaiting the release of relay 714, but upon the release of this relay a circuit previously described is completed for allotter magnet 23. Release relay 707 is then energized in a circuit from grounded battery, winding of relay 707, left-hand armature 1 and back contact of relay 703, conductor 721, contact 2 and right-hand armature of magnet 23 to ground. Release relay 707 opens the circuits for all energized relays and magnets in the translator.

The hyphen

When a hyphen is required in a compound word, it is caused to be typed the same as any other letter. The code corresponding to the hyphen is made up of the letters O, A, U. This record is transmitted to the translator and the hyphen is printed in a manner similar to that for typing any word or syllable.

When the end of the line is reached in an ordinary word and the hyphen combination has not been set up on the keys, a hyphen is automatically inserted at the end of the syllable being typed at the time that the end of the line is reached. This is determined by whether or not the space key has been operated. In case the space key has not been operated, the space relay 703 will not be energized. Therefore, when contact 846 closes at the time the bell rings, a circuit is completed for hyphen relay 709 from grounded battery, winding of relay 709, left-hand armature 2 and back contact of relay 703, contact 846, left-hand front contact and armature of relay 701 to ground. Relay 709 locks to the holding ground and opens the circuit toward the word-space magnet 802. When the syllable being typed is completed, the circuit which normally operated relay 710 is transferred to hyphen relay 808, which, when operated, causes the operation of the key operating magnet which controls the typing of the hyphen. The operation of this magnet energizes relay 710 which releases relay 808, causing in turn the release of the hyphen magnet. Relay 808 is made slow to release to prevent premature release when relay 710 opens the circuit. The end of line relay 714 now operates in a circuit from grounded battery, winding of relay 714, right-hand back contact and armature of relay 721, left-hand armature 2 and front contact of relay 710, left-hand armature 1 and front contact of relay 709, left-hand armature and back contact of hyphen relay 808 to ground. From this point, the action is similar to that previously described under the heading "End of line".

New line

In case the operator desires to start a new line, it is of course necessary to return the carriage to the beginning of the line. This may be automatically accomplished by depressing new line key 728. Before depressing this key, however, it is necessary for the operator to note the register lamps to make sure that the register has been discharged before the new line key is operated. Otherwise, the return movement of the carriage may interfere with the typing of a registered record.

The operation of key 728 energizes relay 721 which locks to the common locking circuit previously traced to ground at off-normal contact 810. Relay 721 operates relay 714 in a circuit from grounded battery, winding of relay 714, right-hand armature and front contact of relay 721, left-hand armature and back contact of relay 701 to ground. From this point, the operation is the same as that previously described under the heading "End of line".

End of page

Paper is fed to the typewriter from rolls as shown in Fig. 15. Each roll is a continuous strip of paper with perforations at suitable intervals so that the sheets may be readily torn or cut apart. When the end of a page is reached, it is necessary to rotate the typewriter roll far enough to bring a new page into proper position.

Three line-counting switches are provided for counting the lines printed. Of these switches, one is used for single spacing, one for double spacing and one for triple spacing. They are all of a type well known in machine switching telephone systems and consist of a wiper arm driven over an arcuate bank of stationary contacts by means of a ratchet and pawl mechanism. Only one of these switches has been shown. The one chosen for illustration is the switch used in connection with double line spacing. Keys for determining which form of line spacing is to be used are shown at 723, 724 and 725.

It will be assumed that all of the counting switches are in normal position. Each switch has enough stationary contacts to count the number of line spacing operations necessary to fill a page. The switch to be used is determined by which one of the controlling keys has been depressed.

When the last line is reached, lamp 827 is lighted to inform the operator of this condition. The operator must then be on guard to see that a word is not split on the end of the line.

The operation at this point follows for a time that previously described under the heading "End of the line". For the sake of clarity, the description will be repeated. When the bell contact 846 closes, while the last word of the last line on the page is being typed, it causes the operation of relay 714, as previously described. Battery feed relay 701 is operated whenever any of the register relays are operated. Relay 714, upon energization, locks to the carriage off-normal contact 810. When the last word is typed, relay 710 is operated in the usual way. This operates the carriage return magnet 816 and the double line counting magnet 811. Magnet 816 causes the return of the carriage to its normal position, and the energization of magnet 811 causes the advance of the counting switch one step on its forward stroke. The energization of magnet 811 operates stepping magnet 815. The line counting switch, in advancing, completes a circuit for the end of page relay 715, since it has now advanced a number of steps equal to the number of lines to be placed on a given page. Relay 715 operates while the carriage is being returned to normal position. The circuit for relay 715 may be traced from grounded battery, left winding of relay 715, armature 3 and front contact of key 724, contact and brush of the double line counting switch to ground. Relay 715, upon energization, locks to the off-normal contact 819 of the double line counting switch. This circuit may be traced from grounded battery, left winding of relay 715, armature 2 and front contact of relay 715, contact 819, armature 2 and contact of key 724, right armature 2 and front contact of relay 710 to ground. Relay 710 was operated in the usual manner and holds open the circuit of allotter magnet 23 to prevent any further typing until a new page has been placed in position.

When the carriage reaches normal position, contact 810 is opened, causing the release of relay 714, which in turn causes the release of magnets 816 and 811. Magnet 815 is deenergized upon the release of magnet 811.

With relay 715 energized, the line counting switch is returned to its normal position. This is accomplished by means of a self-interrupting circuit for magnet 811 which extends from grounded battery, winding of magnet 811, right armature and back contact of magnet 811, left armature 1 and front contact of relay 715, and thence to ground by way of off-normal contact 819, as previousy described. The contacts of the counting switch are arranged in a semi-circle, and two brush sets spaced 180 degrees apart are provided, so that when one brush steps off the last terminal, the other brush engages the normal terminal. In the normal position, the switch is ready to start counting the lines of a new page. When normal position is reached, off-normal contact 819 opens, causing the release of relay 715 and opening the driving circuit for magnet 811. Relay 715, in releasing, advances the allotter in the usual manner, and the various relays and magnets are returned to normal condition in the same manner as previously described for end of line.

It shoud be noted that while magnet 811 is advancing the line counting switch to its normal position, the line space magnet is being operated a corresponding number of steps so as to bring a new page into position for use.

*New page*

After the completion of a page, it is necessary to bring the carriage to the new page position, regardless of its position upon completion of the page. It will also frequently be necessary to move the carriage to the paragraph starting position. After noting that none of the register lamps are lighted, the operator depresses new page key 729. It is necessary to note that none of the register lamps are burning so as to prevent any possibility of moving the carriage prematurely. The depression of key 729 causes the energization of relay 730 which locks to the off-normal contact of the line counting switch. Relay 730 completes a circuit for relay 715 from grounded battery, left winding of relay 715, right back contact and armature of relay 701, armature 1 and front contact of relay 730 to ground. Upon the energization of relay 715, a circuit for relay 710 is completed from grounded battery, winding of relay 710, right-hand armature 1 and back contact of relay 709, conductor 723, armature 3 and front contact of relay 715 to ground. Key 729 should be held operated long enough to allow these relays to operate, whereupon a locking circuit for relay 730 is completed from grounded battery, winding of relay 730, left armature and contact 2 of relay 730, off-normal contact 819, left contact and armature 2 of key 724, right front contact and armature 2 of relay 710 to ground. Relay 715 operates end-of-line relay 714 in a circuit from grounded battery, winding of relay 714, right-hand armature 2 and front contact of relay 715, carriage off-normal contact 810 to ground. The remainder of the operation now takes place in the same manner as for end of line.

*Tabular keys*

Enough tabular keys are provided so that the carriage may be placed in any desired position. Only one key has been shown, but the other keys are similar in operation and put into operation similar controlling circuits. When it is desired to move the carriage to some position other than the paragraph position or the position at the start of a line, the desired tabular key is operated. It will be assumed that the key depressed is key 731. Relay 717 is energized in an obvious circuit and locks to the contact 821 which is individual to the particular tabular key which has been depressed. When the end of the line is reached, the carriage is returned to normal position in a manner previously described, and the paper is advanced into position for the start of the next line. The circuit to the paragraph relay is open at this time. The circuit which would normally operate the allotter magnet is held open at a contact of relay 717 and the circuit is switched over to operate relay 722 instead of the allotter magnet. The circuit for relay 722 may be traced from grounded battery, winding of relay 722, right armature and front contact of relay 717, right back contact and armature of relay 808, right back contact and armature 4 of relay 715, armature 3 and back contact of relay 714, conductor 713, left armature 1 and front contact of relay 710, conductor 712, left armature 2 and back contact of relay 711 to ground. Relay 722, upon energization, locks to the contact 821. Relay 722 operates the word space magnet 802 in a self-interrupting circuit and causes the carriage to advance until the contact 821 opens to cause the release of relay 722. The opening of contact 821 also causes the release of relay 717 which completes the circuit for the allotter, whereupon operations proceed as previously described.

Wipe out

In case it is desired to make a correction, such correction may be accomplished by depressing wipe-out key 93, providing the next combination has not yet been set up on the keys, and provided that the timing relay 30 has not operated. It will be assumed that register 1 has received a record which it now becomes necessary to correct. Since the record has already been taken, the allotter is extending connections to register 2. In this position, the release relay 9 of register 1 is operated in a circuit closed at contacts of the wipe-out key. This circuit may be traced from grounded battery, winding of relay feed relay 6, right winding of relay 9, allotter brush 2 and its second contact, contacts of key 93 to ground. The make busy relay 32 is operated in parallel with the right winding of relay 9 in a circuit from grounded battery, resistance 29, winding of relay 32 and thence to ground as just described. The operation of relay 9 in register 1 opens the circuit for all register relays which have been energized and locked, and such relays thereupon release. The make busy relay, upon energization, locks through its right-hand contact to ground. This holds the circuit busy to the out allotter. The release of the register relays causes the release of the out allotter magnet 23 which advances the allotter to position 1, whereupon magnet 23 is energized in a circuit from grounded battery, winding of relay 23, brush 4 of the out allotter and its first contact, left front contact and armature of relay 32 to ground. The energization of magnet 23 completes a shunt path about the winding of relay 32, which may be traced from ground at the right armature and front contact of relay 23, allotter brush 3 and its first contact, and thence to the winding of relay 32. As a result of the establishment of this shunt circuit, relay 32 releases and removes the operating ground from the winding of magnet 23, which thereupon releases and advances the out allotter into relation with register 2. In this way the out allotter is stepped past position 1 and is made idle at the same time. It should be noted that the contacts associated with brush 2 of the in allotter are slipped one point in advance of the contacts of brush 1, so as to be able to reach the proper register with the wipe out key.

As a result of the above described operation, an erroneous record has been wiped out and the apparatus advanced through a cycle sufficient to bring it into position to receive a proper registration.

Capital letters

When it is desired to start a word with a capital letter, shift key 27 is operated. This key may be operated either simultaneously with the depression of keys corresponding to the first syllable of the word which is to begin with the capital letter, or the key may be individually operated before the keys corresponding to the first syllable are depressed. It will be assumed that the key is operated before the syllable keys have been depressed. In this case, a registration is accomplished in the translator in a manner similar to that previously described for ordinary letters. However, no record is taken which will have any effect toward causing any typing. As a result, the twenty-two test relays, after making the usual test, are all energized, and the printing lead is thus extended through all the test relays. The allotter is then advanced without doing anything beyond taking a record of the fact that the shift key was depressed. The shift relay 733 is energized and locks to the back contact of relay 807. The locking circuit for relay 733 extends from grounded battery, winding of relay 733, left armature and front contact of relay 733, armature and back contact of relay 807 to ground. Relay 807 did not operate because no typing operation was performed. Relay 733 holds the shift magnet operated in a circuit from grounded battery, winding of the shift magnet, which has not been shown but which would be connected to lead 822 (Fig. 8), and thence to the right armature and front contact of relay 733 to ground.

The record corresponding to the first syllable of the word which is to begin with a capital is now taken by the translator. The action now proceeds in the same manner as though the shift key had been operated at the same time as the keys for the first syllable. The typing operation takes place in the usual manner except that inasmuch as the shift magnet is energized, the type prints a capital letter. As soon as the printing magnet is operated, relay 807 is energized in a circuit previously traced. Relay 807, upon energization, unlocks the shift relay 733, which in turn releases the shift magnet so that subsequent letters will be typed in small letters.

If the word is to consist entirely of capital letters, shift key 734 is operated. The operation of this key energizes the shift locking relay 735, which thereupon locks to contacts of key 736. Before depressing key 734 it is necessary to ascertain that all register lamps are extinguished. The energization of relay 735 lights a lamp 737 to indicate that all letters are now being printed as capital letters. Relay 735 operates the shift magnet and holds it operated over a circuit similar to the one traced for relay 733. In the present case, however, the continued energization of the shift magnet is not dependent on the holding ground furnished by relay 807 and the typing of capital letters will continue until the shift release key 736 is depressed. Before depressing the shift release key 736, it is necessary to see that none of the register lamps are lighted and also to make sure that the printing of the complete number of desired capital letters has been completed.

*Timing circuits*

Slow operating relay 1114 is arranged to allow suitable time for the operation of the typewriter key controlling magnets. If any one of these magnets fails to operate, relay 1114 energizes for a predetermined interval and bridges the contacts of all magnets. This completes a substitute circuit for the one which would ordinarily be closed by whichever one of the key-controlling magnets was operated. As a result, the relays and apparatus continue to function, the only difference being that the magnet whose circuit was inoperative has failed to type. Relay 1114 also operates the word space magnet 802 to provide space for the missing letter so that it can subsequently be filled in by means of an ordianry typewriter. The circuit for relay 1114 extends from grounded battery, winding of relay 1114, lower back contact and armature of any one of the lower counting relays which is associated with a magnet in an unstandard condition. It will be assumed that the magnet which has failed to print is the one associated with relay 1104, corresponding to the letter T. The printing circuit for the letter T has been previously traced and extends through armature 3 and back contact of relay 1014. Since armatures 2 and 3 of relay 1014 are electrically connected, the same ground which should cause the operation of key controlling magnet T is extended to the back contact of armature 2 of relay 1014. The circuit for relay 1114 may therefore be traced to armature 2 of relay 1014 and thence to ground over a path previously described. The circuit controlled by armature 1 of relay 1114 accomplishes the same results as would have been accomplished at contacts of the key controlling magnet T, provided that magnet had operated. Since the key controlling magnet would have operated relay 1014, it follows that a substitute circuit is now provided for relay 1014 extending from grounded battery, winding of relay 1014, left armature and back contact of relay 1013, conductor 1017, left armature and front contact of relay 1004, conductor 1018, armature 1 and front contact of relay 1114, winding of relay 807 to ground. Relay 1014 is energized and opens the circuit of relay 1114 which releases slowly in a time interval equal to that normally consumed by the controlling magnets in releasing. The slow release of relay 1114 insures the operation of relay 1014. When relay 1114 is de-energized, it removes a shunt circuit from about the winding of relay 1013 and this relay energizes. From this point, operation proceeds in the regular manner.

It should be noted that this method of procedure allows the machine to be kept in operation even though some of the circuits are defective. In this way, delays are avoided, since the machine can be used with suitable interpolation at a later time and it is not necessary to discontinue use of the machine while awaiting the arrival of a repair man.

*Multiplicity of typewriters*

It must be borne in mind that any number of typewriters can easily be controlled from a single keyboard. The typewriters must of course each be equipped with key controlling electromagnets. All of these magnets and their respective contacts must be connected to the same control wires in multiple. The possibility of the use of a large number of typewriters simultaneously provides a very definite advantage, inasmuch as with this arrangement it is possible to obtain any desired number of original copies as a result of a single manipulation of the keyboard.

*Punctuation*

The control of the typing of some punctuation marks is somewhat different from the typing of ordinary letters. The method of typing the colon will be taken as a sample. Referring to the chart illustrated in Fig. 14, it will be seen that the suffix combination is FRPBLGTE and that the test relays involved are those reached over lead 13. As a result, relays 1101 and 1115 are the test relays used. These relays normally control the typing of the letter F.

The first part of the operation takes place in the same manner as that for any word or syllable. After the record has been taken from the above keys, the test relays are all operated with the exception of relays 1101 and 1115. The printing lead 1020 is extended through contacts of all test relays preceding 1101 and then extends by way of the right armature and back contact of relay 1101, armature 2 and back contact of relay 1115, armature 14 of relay 1007 and its front contact, armature 13 and front contact of relay 1001, conductor 824, armature 4 and front contact of relay 501, left armature 2 and front contact of relay 503, left armature 5 and front contact of relay 504, right armature 4 and front contact of relay 502, left armature 3 and front contact of relay 602, conductor 505, winding of relay 825, winding of relay 826 to grounded battery. Relays 825 and 826 are energized. Relay 826 energizes the shift magnet in an obvious circuit. Relay 825 at its left armature operates a circuit for the controlling magnet which causes the typing of the colon. The circuit to the key controlling magnet extends directly from the arrow in which the circuit from the front contact of relay 825 terminates. Ground is supplied to the left armature of relay 825 from the back contact and armature 6 of relay 805.

In case an asterisk is to be printed, the combination is the same as that just described, except that the numeral bar of the key set is depressed along with the setting up of the remainder of the code. As a result, relay 805 is energized in a circuit similar to one previously described. As a result, when relay 825 is energized, ground is supplied to its right-hand armature instead of its left-hand armature, and a circuit to the asterisk controlling magnet is completed by way of the right armature of relay 825.

Circuits for accomplishing other forms of punctuation are completed in substantially similar manner. In some cases it is not necessary that the shift magnet be operated, in which case, of course, relay 826 is not energized. In some cases, as in the case of the period, it is not necessary to energize any of the relays of Fig. 8, in which case the key controlling electromagnet is directly controlled from the operating lead.

Carriage return

If for any reason it is desired to return the carriage to normal position before the end of the line is reached, as for underlining, the following procedure is used. After ascertaining that none of the register lamps are lighted, the carriage return key 738 is operated. This completes an energizing circuit for the carriage return relay 739. Relay 739, upon energization, locks to the carriage off-normal contact 810 and operates carriage return magnet 816 in an obvious circuit controlled at the left armature of relay 739. As soon as the carriage reaches its normal position, relay 739 is released and releases the carriage return magnet. In this case, the roll is not advanced.

Back spacing and underlining

In case the device is being used to receive dictation directly, it is unlikely that the back space will be used, as it would slow down operations to a considerable extent. The chief reason for the use of back spacing is ordinarily for the insertion of underlining, and it is of course obvious that any underlining which is to be done could be accomplished after the dictation is finished by the use of an ordinary typewriter.

In the case of a typist who is not taking dictation, it may be desirable to use a back spacing and underlining feature. When it is necessary to underline a given word or words, the operator waits until all the register lamps are extinguished and then operates the back space key as many times as there are letters and spaces in the words to be underlined. The operation of back space key 741 controls the back spacing magnet of the typewriter directly. As a result, the carriage is moved back one step or space position for each stroke of the key. Underlining is then accomplished by depressing the proper combination as many times as is necessary to accomplish an underlining of the desired extent. The combination for controlling underlining is OAUI.

Line space

Line spacing may be done at any desired time, it being necessary to ascertain first that none of the register lamps are burning. Operation of key 828 operates the line spacing magnet directly. The key is depressed once for each line spacing operation until the desired spacing has been accomplished.

Last word visible

Lamps are provided adjacent to the keyboard to indicate the last combination of keys operated. The lamps are arranged in relative position similar to that of the keys and may be read either directly or may be mentally translated into the word or syllable represented by the keys last depressed. The circuits for the lamps may be traced from a ground at brush 3 of the in allotter which lags one step behind the main distributing brush 1. When the record has been taken in register 1 and the allotter has advanced to position 2, brush 3 will be in engagement with contact 2, and a circuit may be traced over conductor 35 to the contacts of all register relays of register 1, and thence through contacts of all energized relays to the associated lamps and battery and ground. Lamps T' and S' have been illustrated in Fig. 2. The remaining lamps are similarly connected to the register relays.

In order to more readily identify the various apparatus the following table is submitted, showing the meaning of the various abbreviations applied to relays and magnets.

IT = I for the register number and T for the letter designation on the operating key RL = Release
SP = Space
BF = Battery feed
MB = Make busy
PAR = Paragraph
TAB = Tabular
CR = Carriage return
EP = End of page
EL = End of line
NL = New line
NP = New page
HYP = Hyphen
SL = Shift lock
WS = Word space
LSM = Line space magnet
DLCM = Double line counter magnet
CRM = Carriage return magnet
TM = Timing
RC = Register control
SOR = Shift over relay
ST = Test relay for letter S
ET = Test relay for letter E, etc.
NUM = Numerical
ROT = Rotary magnet for step-by-step switch
RET = Return magnet for step-by-step switch
TC = Test control

What is claimed is:

1. In a transmitting and receiving device, a set of registers, a keyset, means to operate said keyset in code combinations to set said registers successively, a secondary register common to said first registers, means to set said secondary register repeatedly under the control of each of said first registers, and means to produce from said secondary register a record in decoded or expanded form.

2. In a transmitting and receiving device, a controlling device, a set of registers, means to successively associate said registers with said controlling device a secondary register common to said first registers, a translating device associated with said secondary registers, means to successively associate each of said registers with said translating device, and means including said translating device to produce a record corresponding to that set up on the controlling device but in decoded or expanded form.

3. In a transmitting and receiving device, a controlling device, a set of registers, means to successively associate said registers with said controlling device in repeated cycles a secondary register common to said first registers, a translating device associated with said secondary register, a recording device, means to set said registers to record thereon in code any desired message or intelligence, and means including said translating device and said recording device to produce a record of said intelligence in decoded or expanded form.

4. In a transmitting and receiving device, a controlling device, a set of registers, a cyclic progression switch for repeatedly associating said registers with said controlling device in succession, a translating device, a cyclic progression switch for repeatedly associating said registers with said translating device in succession, and means to operate said progression switches independently of time relation.

5. A printing or type-setting machine, a keyboard of non-locking keys to control said machine, means to set up by operation of said keyboard at a single stroke designations corresponding to a plurality of characters, means to reproduce said characters from said machine in succession and arranged in proper sequence, an indicator and means to display on said indicator after the keys are released the designations set up by said keys.

6. In a transmitting and receiving device, a controlling device, a set of registers, a cyclic progression switch for repeatedly associating said registers with said controlling device in succession, a translating device, a cyclic progression switch for repeatedly associating said registers with said translating device in succession, a progression indicator, and means to operate said indicator to show the stage of operation of said apparatus.

7. A printing or type-setting machine, a keyboard of non-locking keys to control said machine, means to set up by operation of said keyboard at a single stroke designations corresponding to a plurality of characters, a register, means to transfer said designations to said register, means to reproduce said characters from said machine in succession and arranged in proper sequence, an indicator, means to display on said indicator, after the keys are released, the designations set up by said keys, a wipe-out key, and means operative upon depression of said wipe-out key to cancel said registration when said indicator shows that an erroneous key-setting has been made.

8. In a transmitting and receiving device, a controlling device, a set of registers, means to successively position said registers from said controlling device in repeated cycles, a translating device, means to transfer settings from said registers to said translating device, a signal, and means to operate said signal if at any point in the cycle the register next in order for resetting has not yet transferred its registration to said translating device.

9. A printing machine having printing and letter spacing mechanism, a key board, means to remotely control said machine from said keyboard, and means to actuate the letter spacing mechanism to leave an unprinted space when there is a printing failure for any particular letter.

10. A remotely controlled typewriter having a rotatable platen, means to automatically rotate said platen for line spacing when the end of a line is reached, keys, means remotely controlled by said keys to determine whether said line-spacing shall be single, double or triple line-spacing, said last mentioned means including an electro-magnetically operated, progressive switching device.

11. A remotely controlled printing or typesetting machine, including a carriage for said machine, a contact actuating element secured to said carriage and movable therewith, groups of electrical contacts in operative relation to said element, groups of signals, electrical connections between the contacts of each group and the signals of an associated group and means to advance said element to successively actuate said contacts to simultaneously operate signals in a plurality of said groups, to provide varied information as to the operation of said machine.

12. A remotely controlled typewriter, including a platen, means to move said platen into position to start a new line after the end of each line typed, automatic testing means testing the typing of the final syllable of the line when the end of line is reached, and means under the control of said testing means to cause said typewriter to print a hyphen after the syllable which terminates the line in case the testing means determines that the typing of the final syllable of the line has failed to finish the typing of a complete word.

13. A remotely controlled typewriter, including a platen, means to automatically advance said platen into position to start a new line after the end of each line typed, a paper feed roll, a counting device, means to operate said counting device to record the number of lines typed, and automatic means controlled by said counting device to advance said platen, in a special line spacing movement after a full page has been typed, to a position suitable for the start of a new page.

14. A remotely controlled typewriter, including a platen, means to automatically advance said platen into position to start a new line after the end of each line typed, a paper feed roll, a counting device, means to operate said counting device to record the number of lines typed, automatic means controlled by said counting device to advance said platen, in a special line spacing movement after a full page has been typed, to a position suitable for the start of a new page, and operator controlled means to control said device and means at will to advance said platen to a new page position.

15. A remotely controlled typewriter, including a platen, a carriage, means to automatically advance said platen and carriage for line and letter spacing purposes, electrical testing apparatus, means to operate said typewriter to print tabulations under the control of said testing apparatus and advancing means, and means to locate the tabular column at any desired space for letter.

16. In a receiving device, a register, means to set said register to simultaneously record thereon designations comprising one, two or more characters, a translating device, a recording device and means including said translating device and said recording device to produce a record of said designation, the number of characters in said designation as reproduced being equal to or less than those originally set up on said register as determined by the operation of said translating device.

17. In a receiving device, a register, a key set, means to set said register under the control of said key set to simultaneously record thereon designations comprising one, two or more characters, a translating device, a recording device and means including said translating device and said recording device to produce a record of said designation, the number of characters in said designation as reproduced being equal to or less than those originally set up on said key set as determined by the operation of said translating device.

18. In a receiving device, a register, means to set said register to simultaneously record thereon designations comprising one, two or more characters, a translating device, a printing device, and means including said translating device and said printing device to produce a printed record of said designation, the number of characters printed being equal to or less than those originally set up on said register as determined by the operation of said translating device.

19. In a receiving device, a register, a key set, means to set said register under the control of said key set to simultaneously record thereon designations comprising one, two or more characters, a translating device, a printing device, and means including said translating device to operate said printing device to produce a printed record of said designation, the number of characters printed being equal to or less than those originally set up on said key set as determined by the operation of said translating device.

20. In a receiving device, a primary register, a secondary register, means to set said primary register to simultaneously record thereon designations comprising one, two or more characters, means to set said secondary register from said primary register, a recording device, and means to operate said recording device to produce from said secondary register a record of said designation, the number of characters in said designation as reproduced being equal to or less than those originally set up on said primary register.

In witness whereof, I hereunto subscribe my name this 12th day of January, A. D. 1928.

EDGAR H. CLARK.